United States Patent [19]

Lee

[11] 4,339,993
[45] Jul. 20, 1982

[54] FORTUNE COOKIE MACHINE

[76] Inventor: Yongsik Lee, 162 Winter St., Weston, Mass. 02193

[21] Appl. No.: 141,371

[22] Filed: Apr. 18, 1980

[51] Int. Cl.³ .............................................. A47J 37/00
[52] U.S. Cl. ...................................... 99/354; 99/355; 99/373; 99/374; 99/443 C; 414/751; 425/112
[58] Field of Search ................ 99/353, 354, 355, 372, 99/373, 377, 380, 443 C, 450.1, 450.4; 414/749, 751; 426/502; 425/319, 383, 444, 500, 515, 518, 112

[56] References Cited

U.S. PATENT DOCUMENTS

| | | | |
|---|---|---|---|
| 967,147 | 8/1910 | Trewick | 99/373 |
| 3,265,016 | 8/1966 | Cheung | 99/353 |
| 3,605,642 | 9/1971 | Brown | 99/354 |
| 3,950,123 | 4/1976 | Louie | 425/500 |
| 3,983,262 | 9/1976 | Brunner | 99/354 |
| 4,012,184 | 3/1977 | Ma | 425/500 X |
| 4,138,938 | 2/1979 | Kitamura | 99/355 X |
| 4,274,331 | 6/1981 | Jensen | 99/373 |

*Primary Examiner*—Billy J. Wilhite
*Attorney, Agent, or Firm*—Wolf, Greenfield & Sacks

[57] ABSTRACT

A fortune cookie making machine includes a first rotatable assembly having a number of griddles in which the cookie blanks are passed through an oven where they are baked. Thereafter a transfer mechanism strips the cookie blanks one at a time from the griddles and deposits them in a second assembly for stuffing and forming the cookies. In certain embodiments of the invention the second assembly is also rotatable. In the second assembly, a paper slip bearing the fortune message is deposited on the blank, and then the cookie blank is folded and allowed to cool to form the final desired shape. After the cookie is fully formed, it is removed from the second assembly.

29 Claims, 45 Drawing Figures

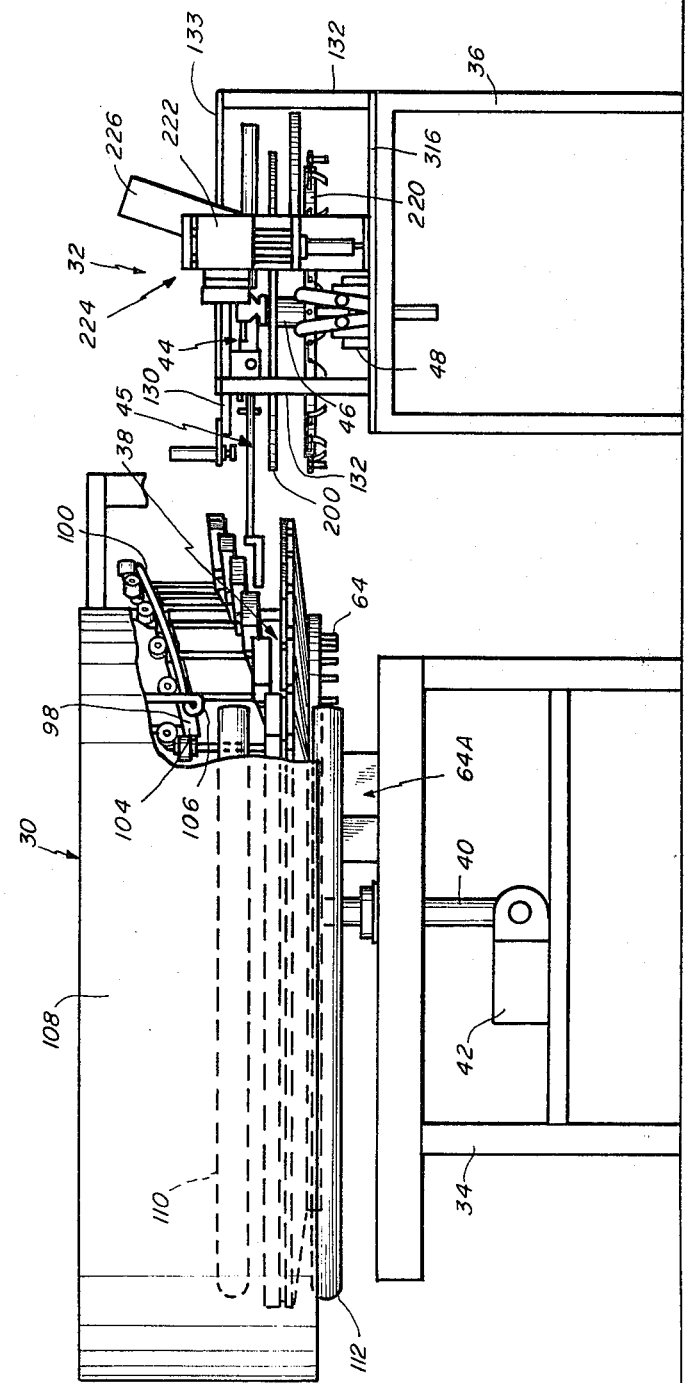

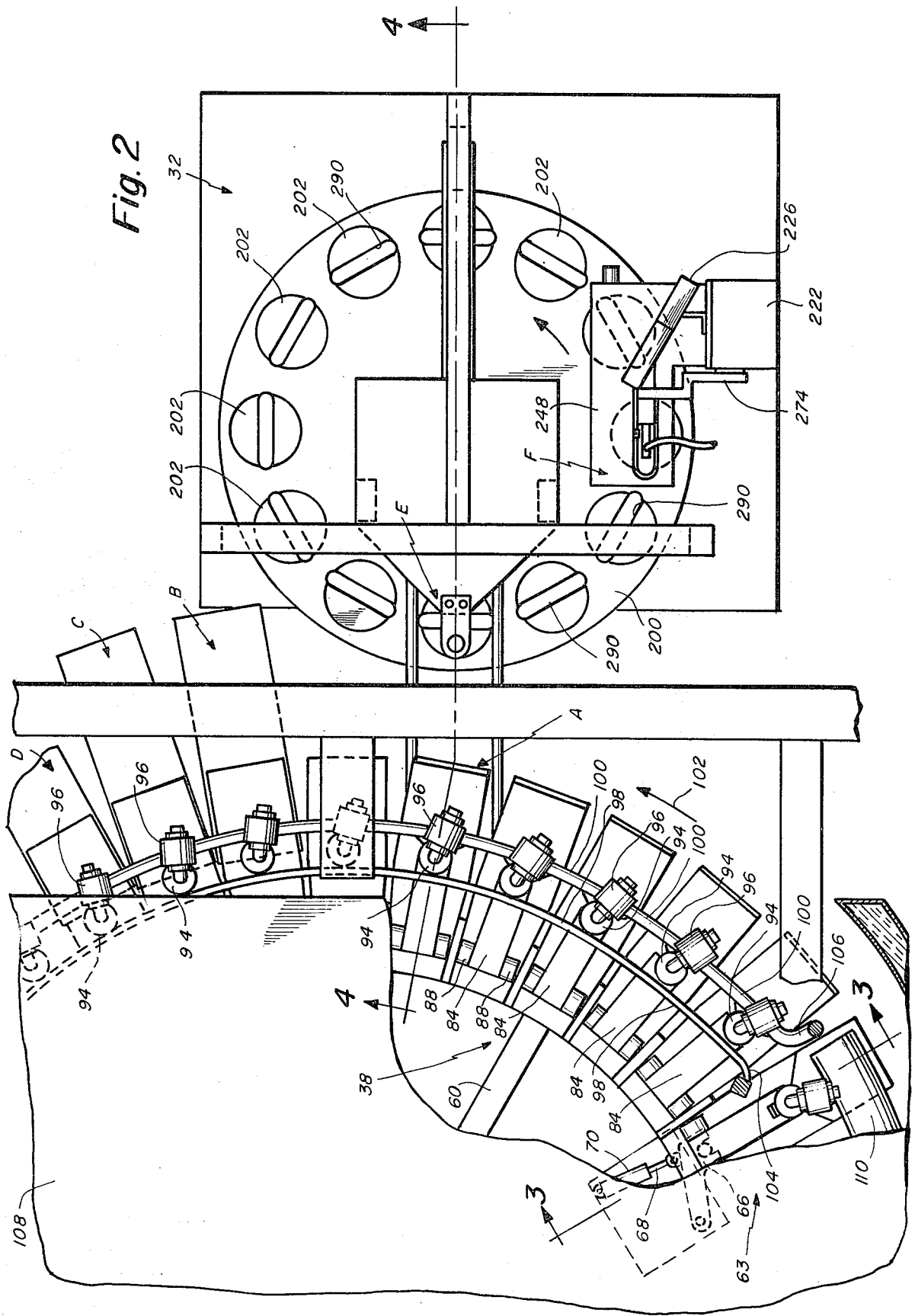

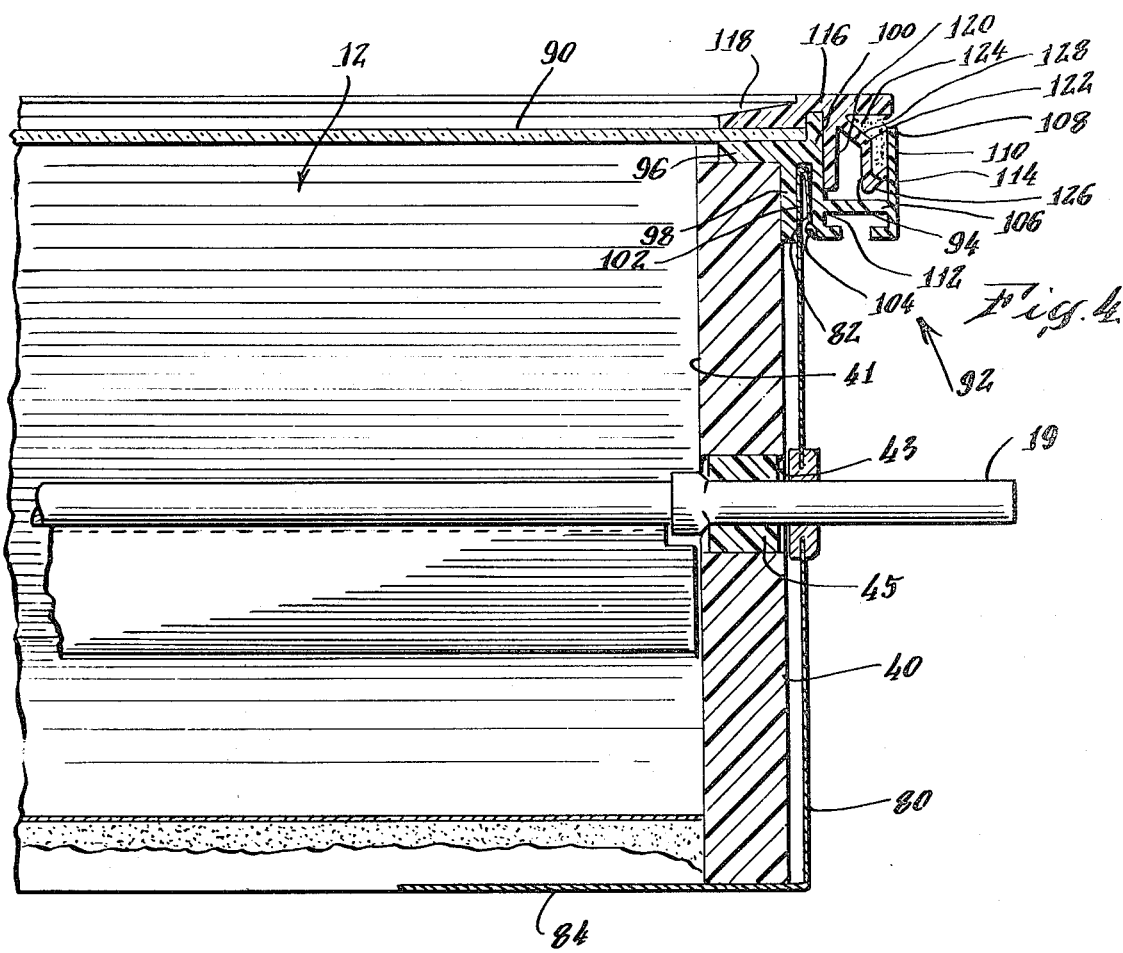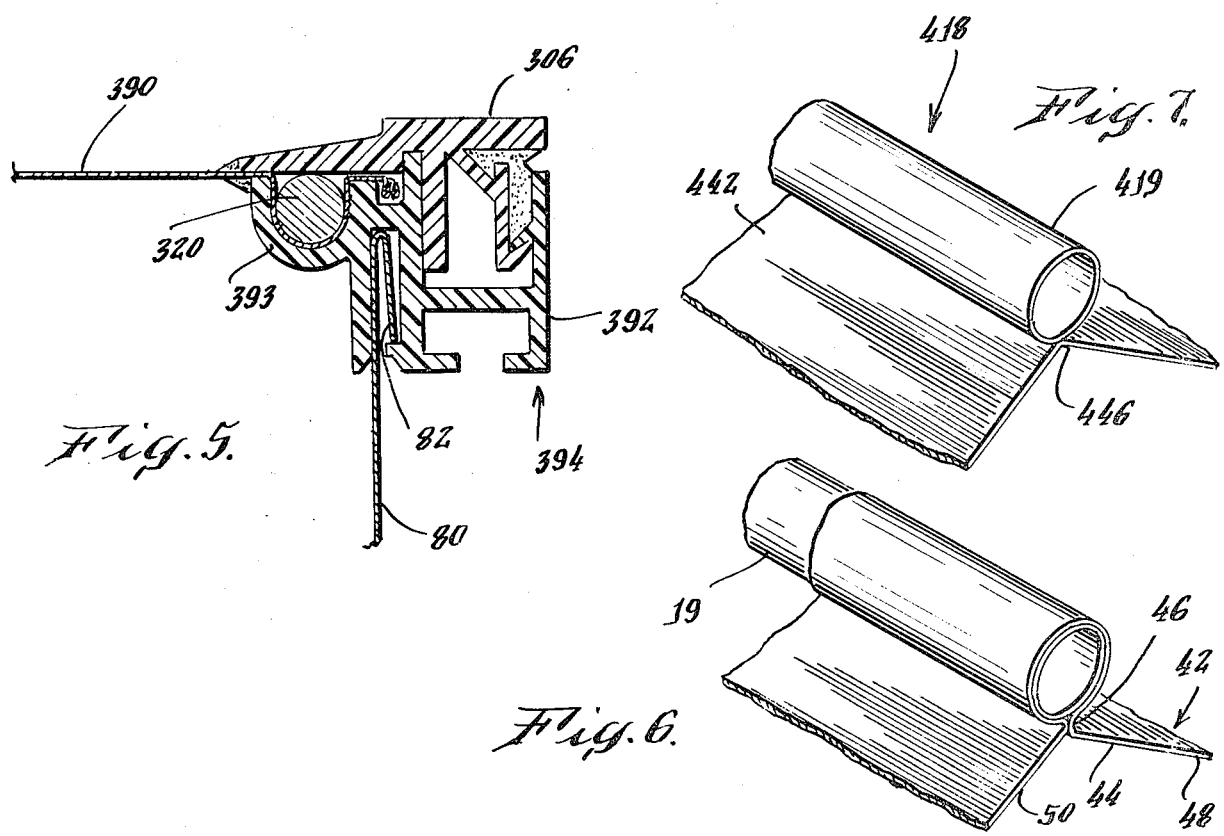

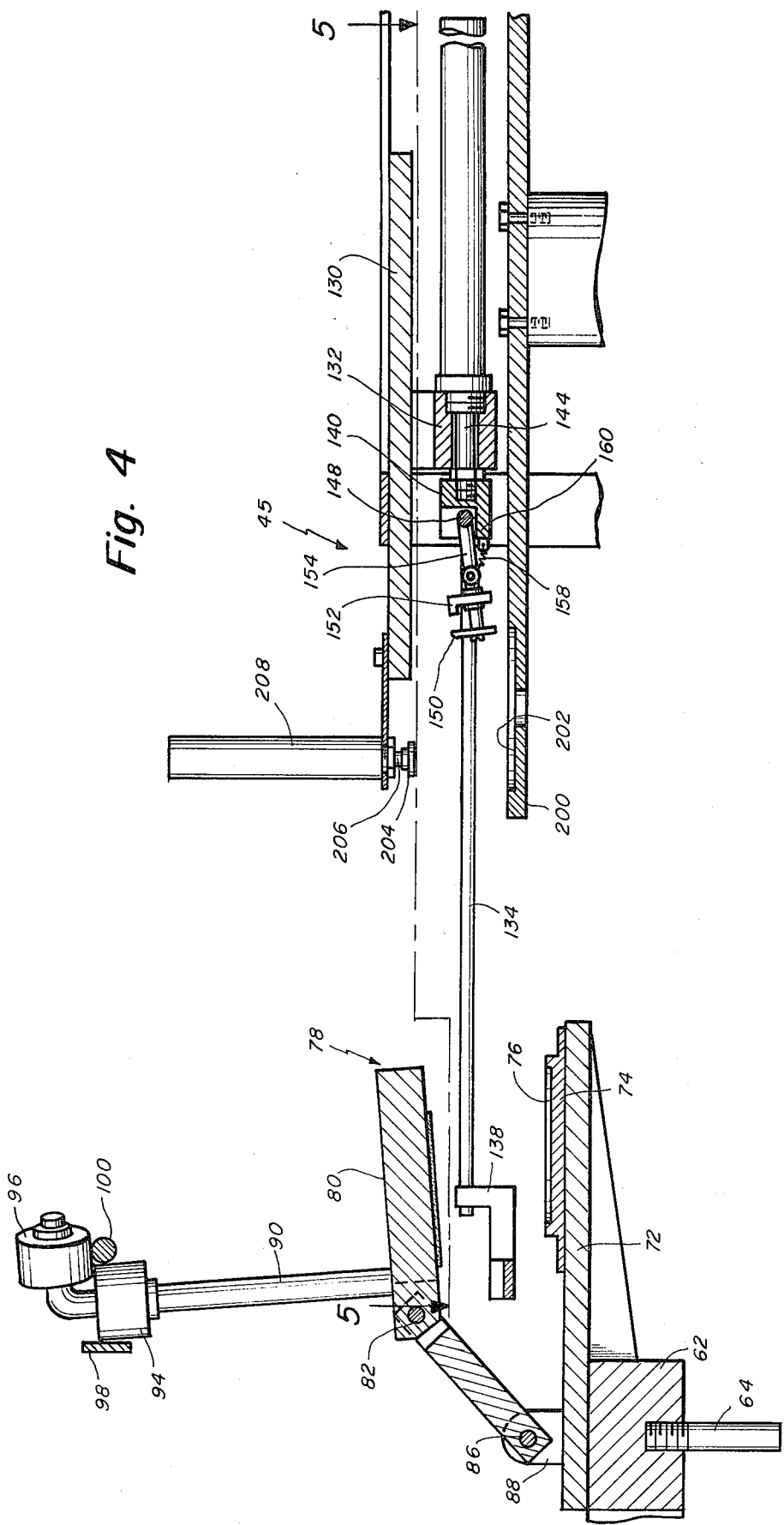

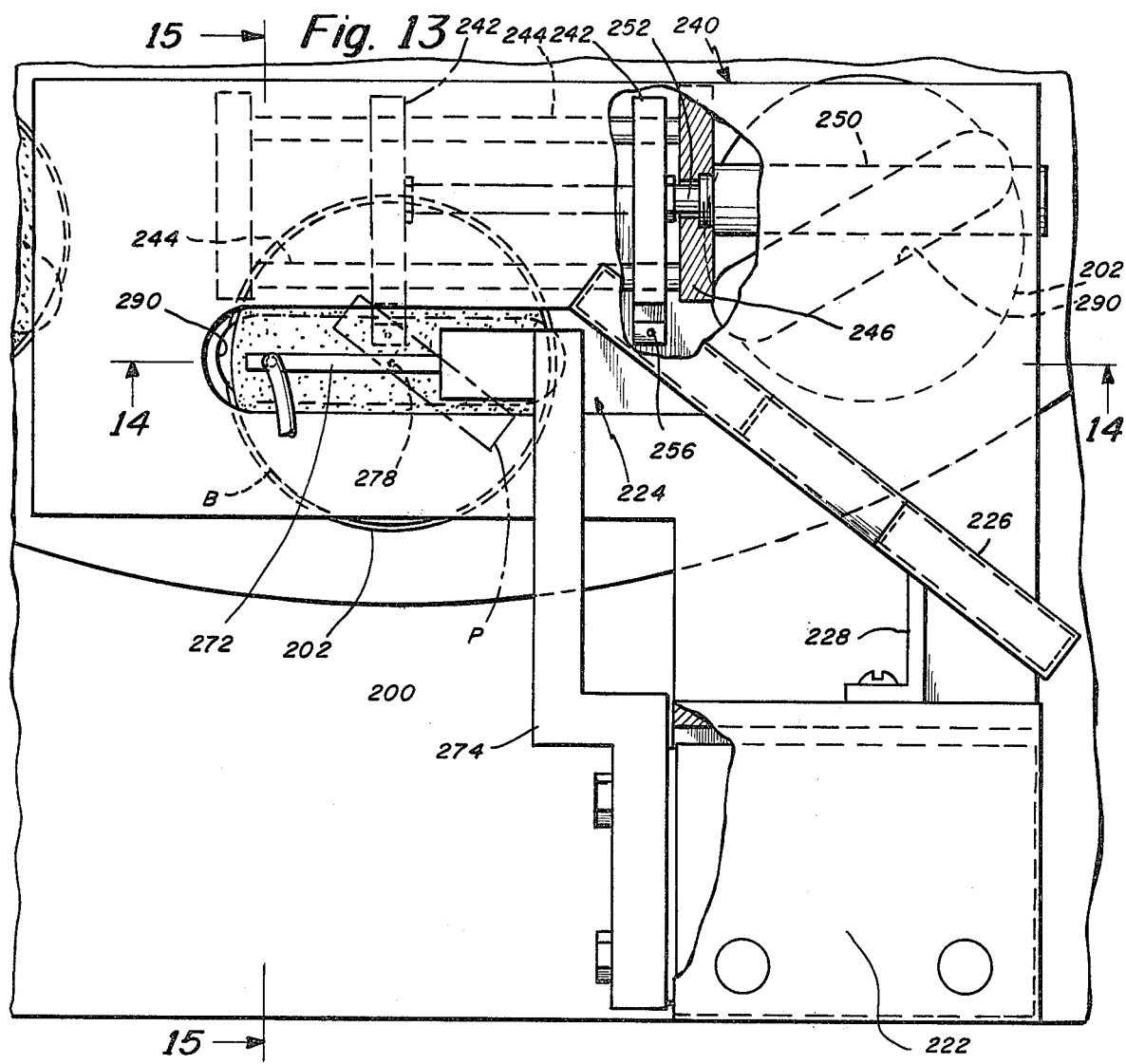
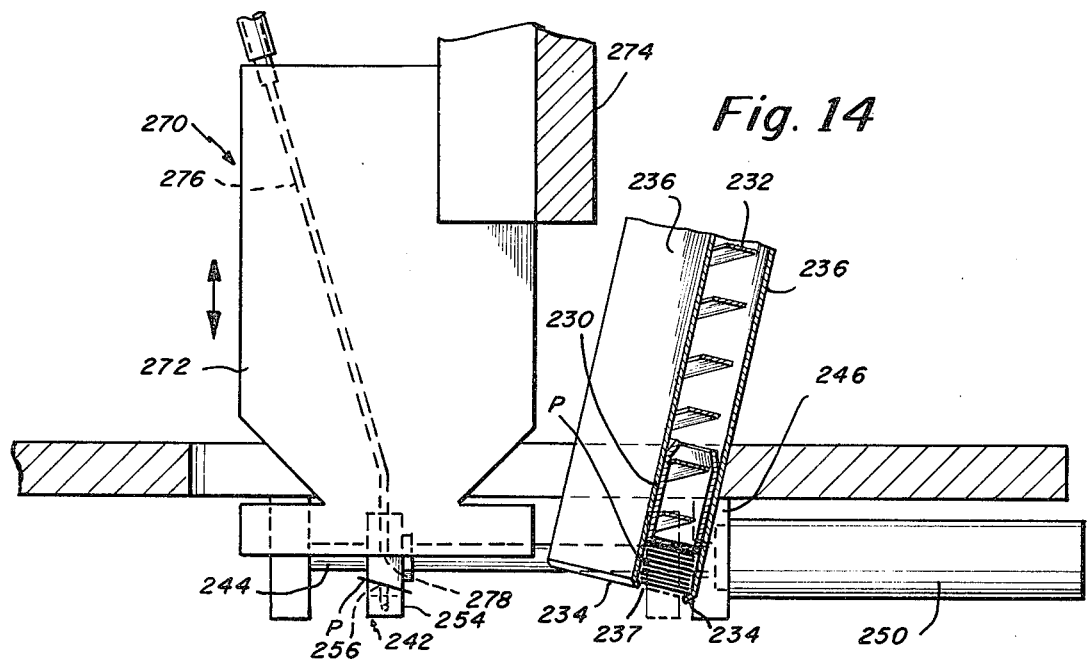

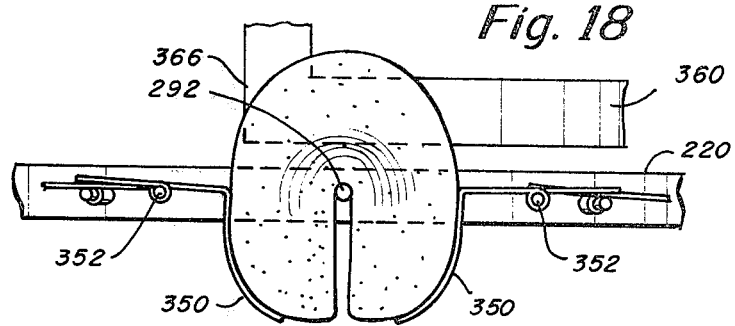
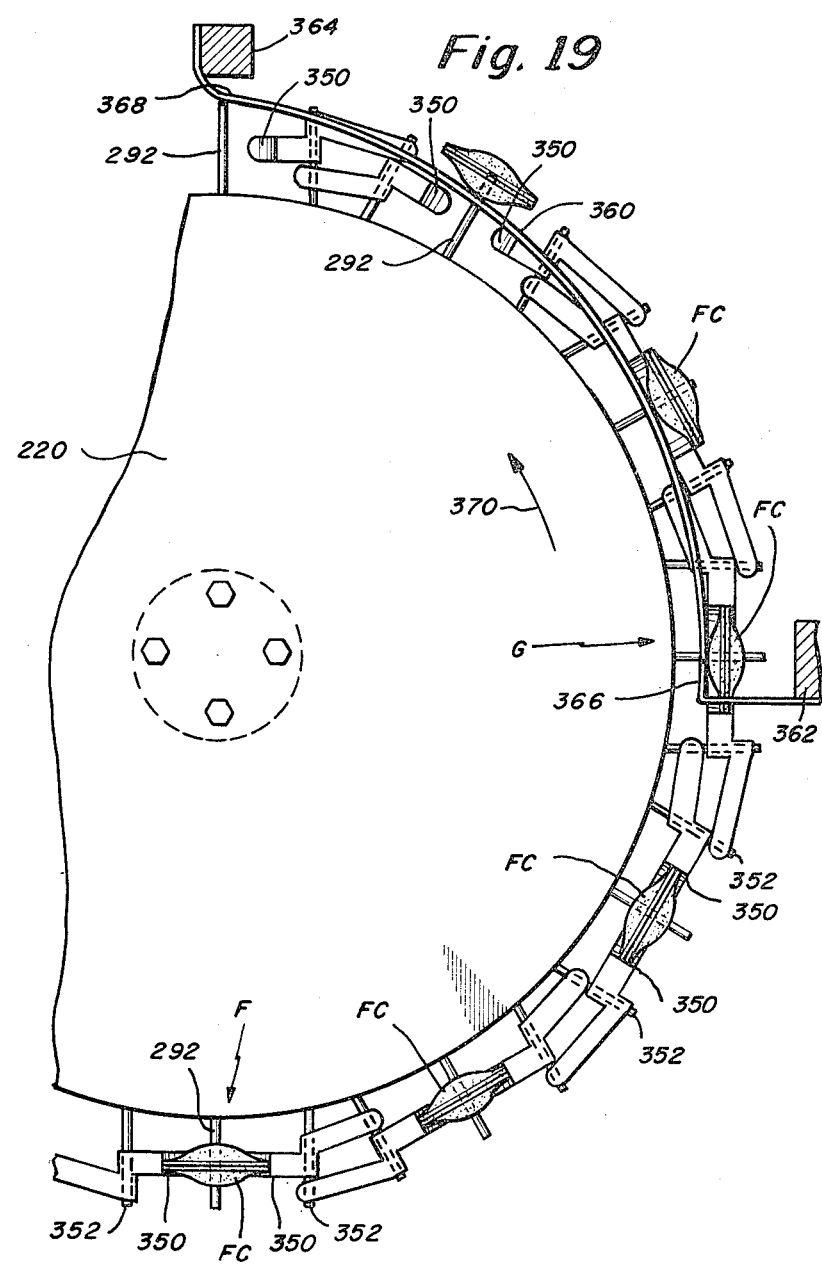

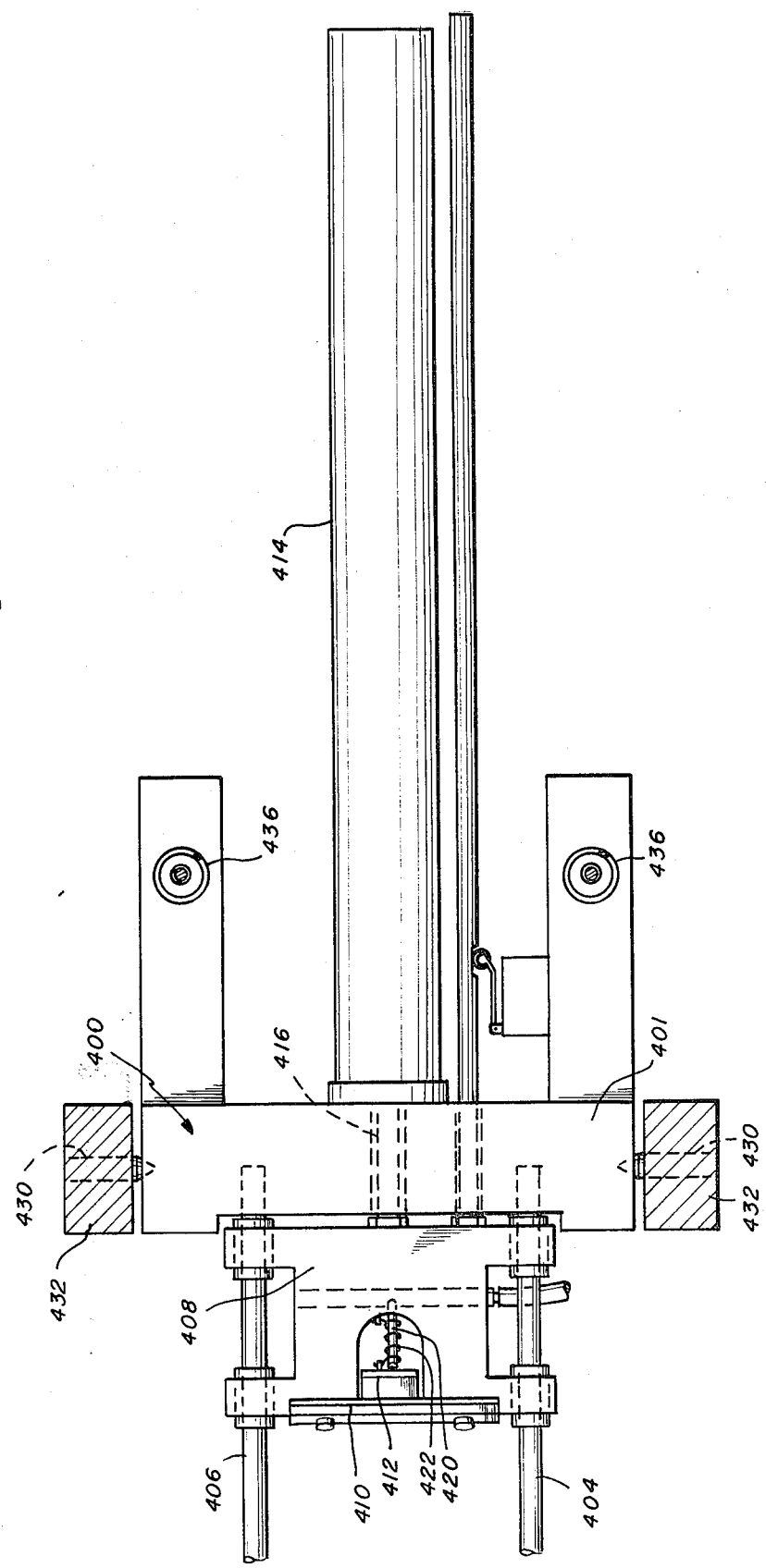

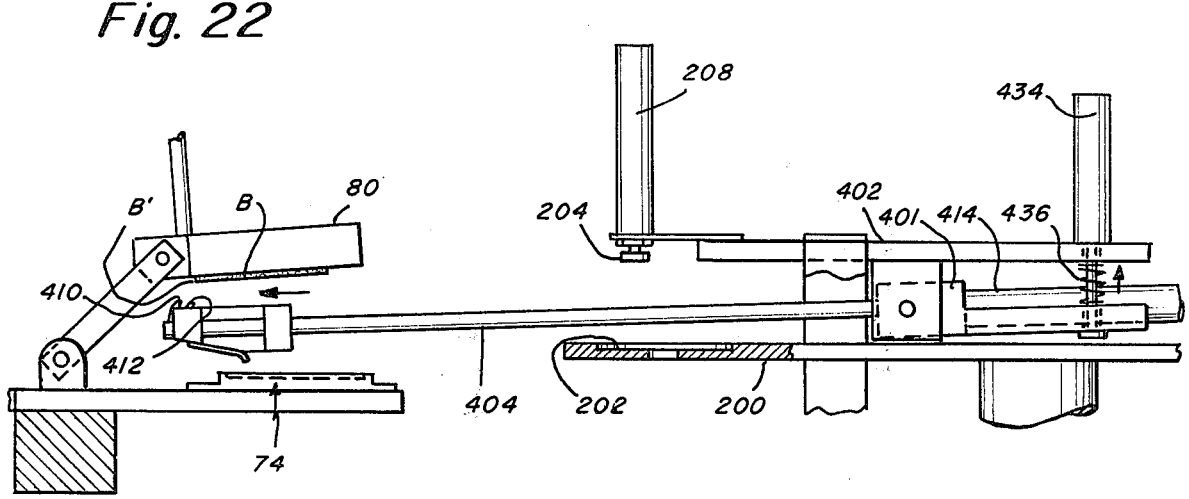

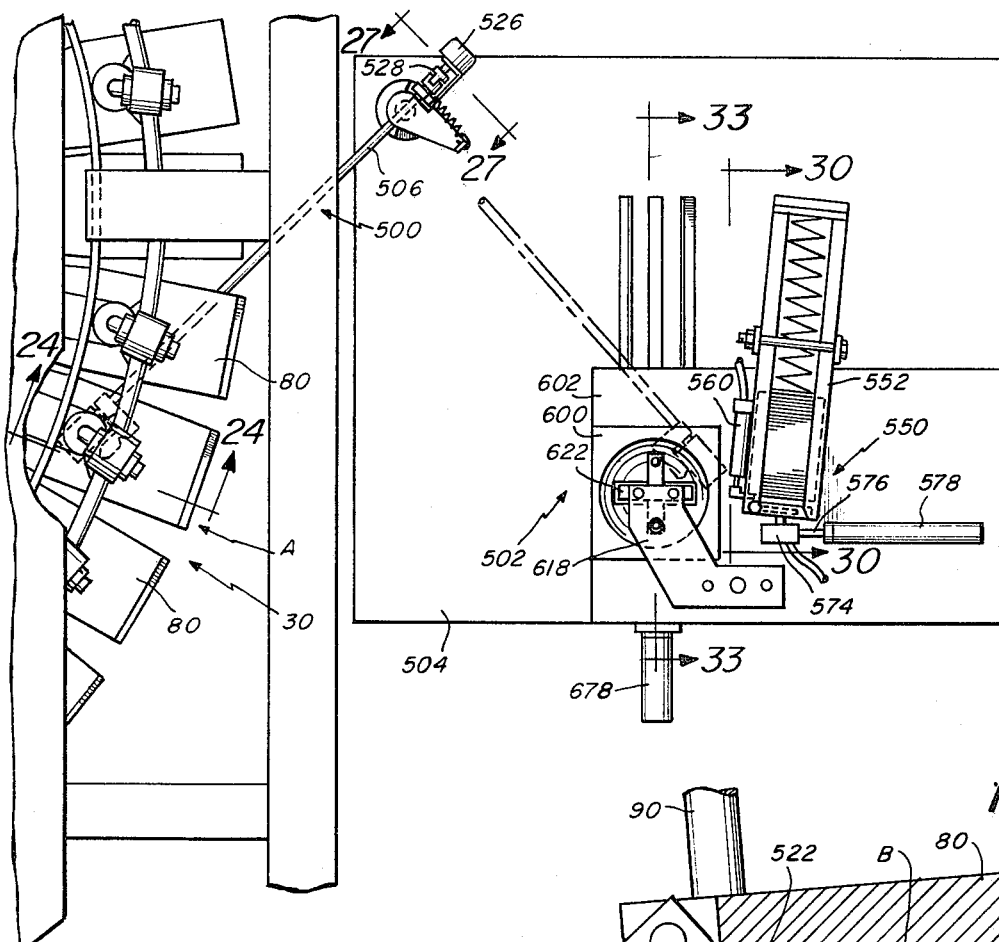

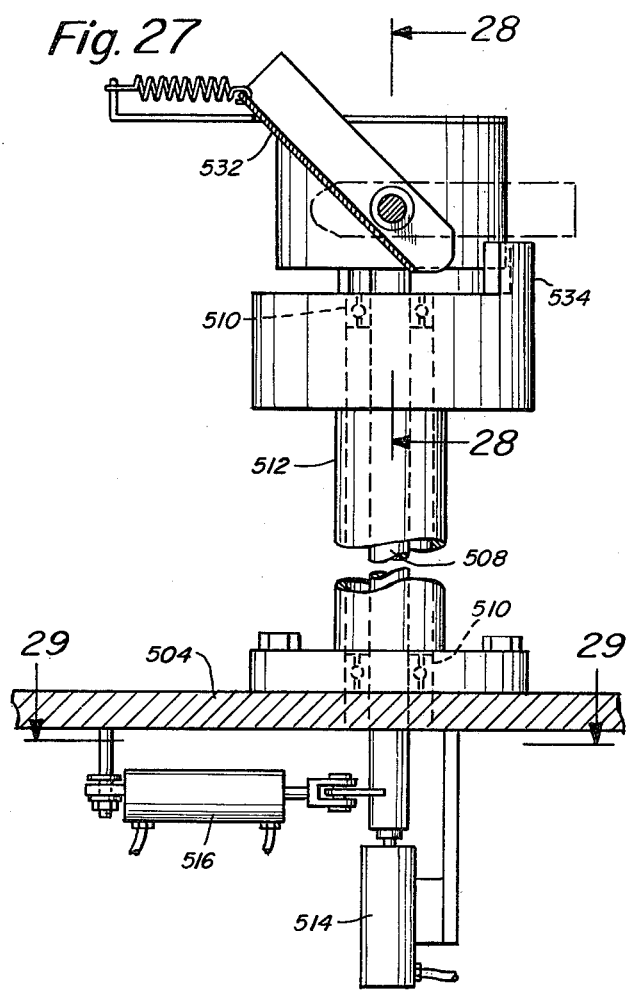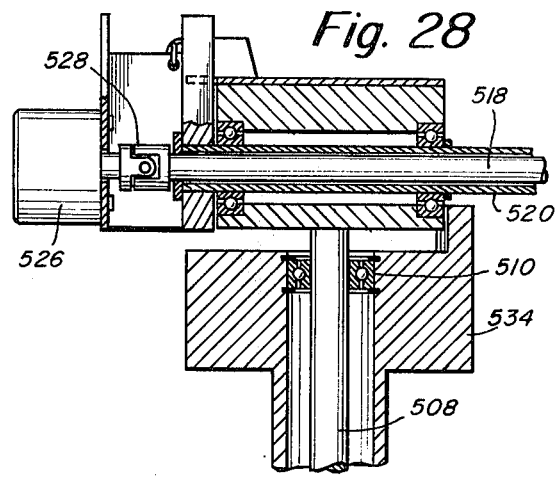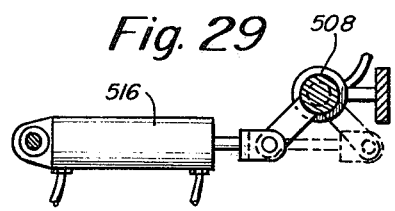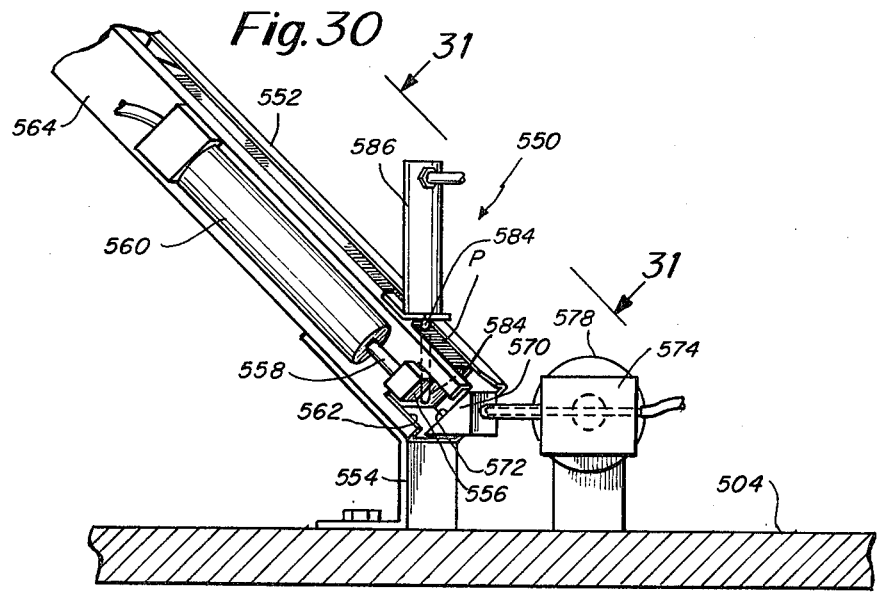

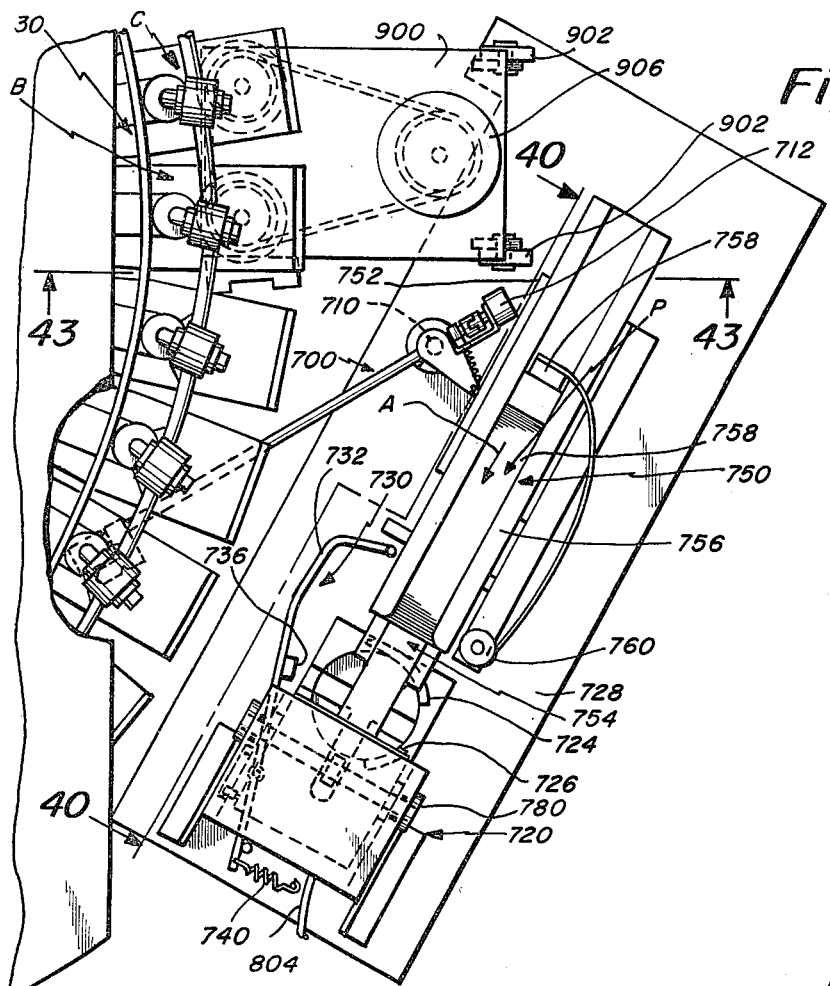
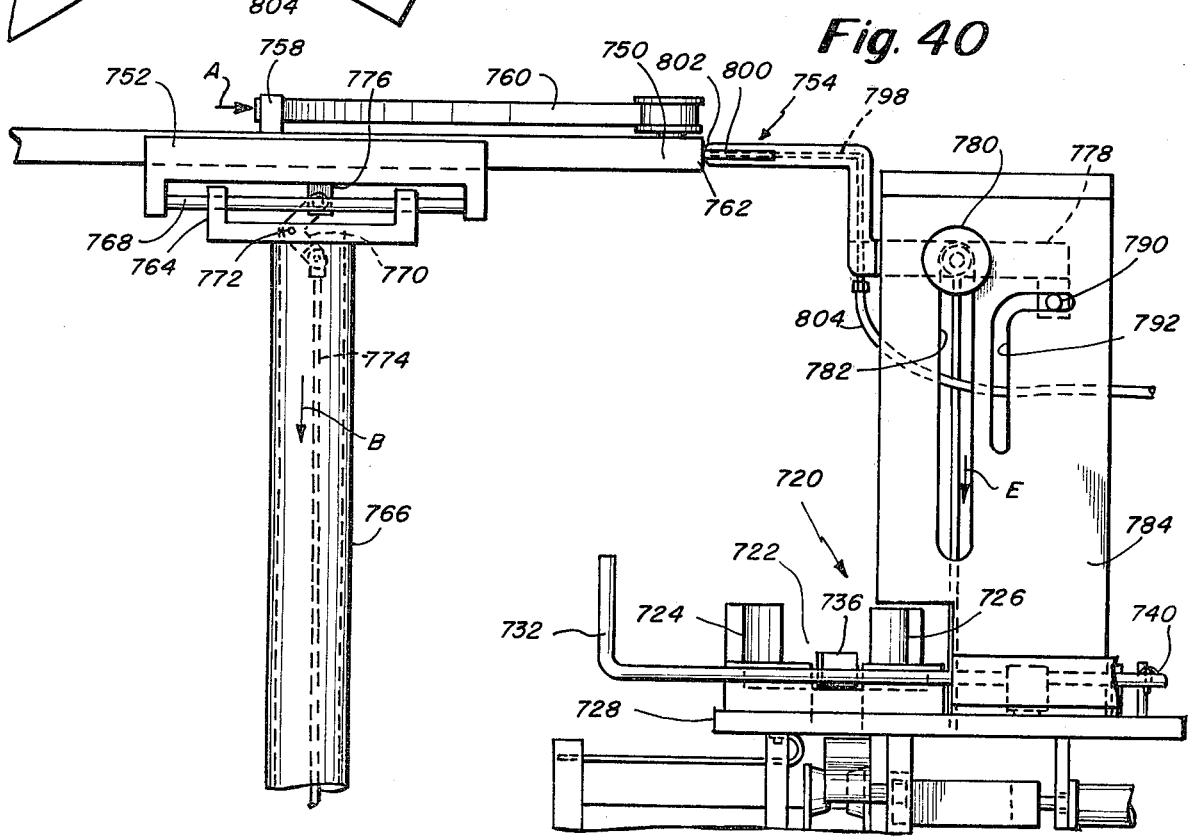

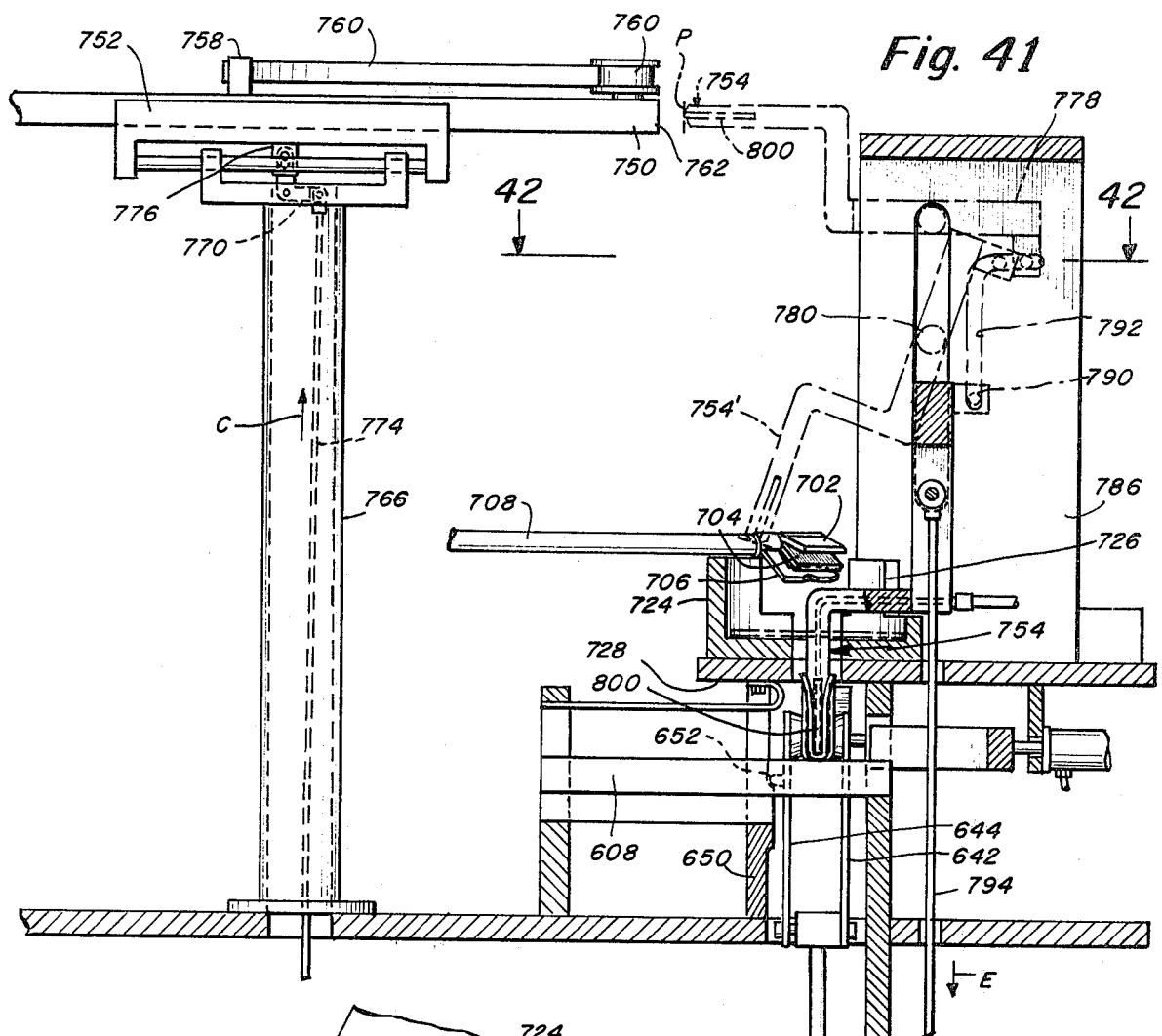
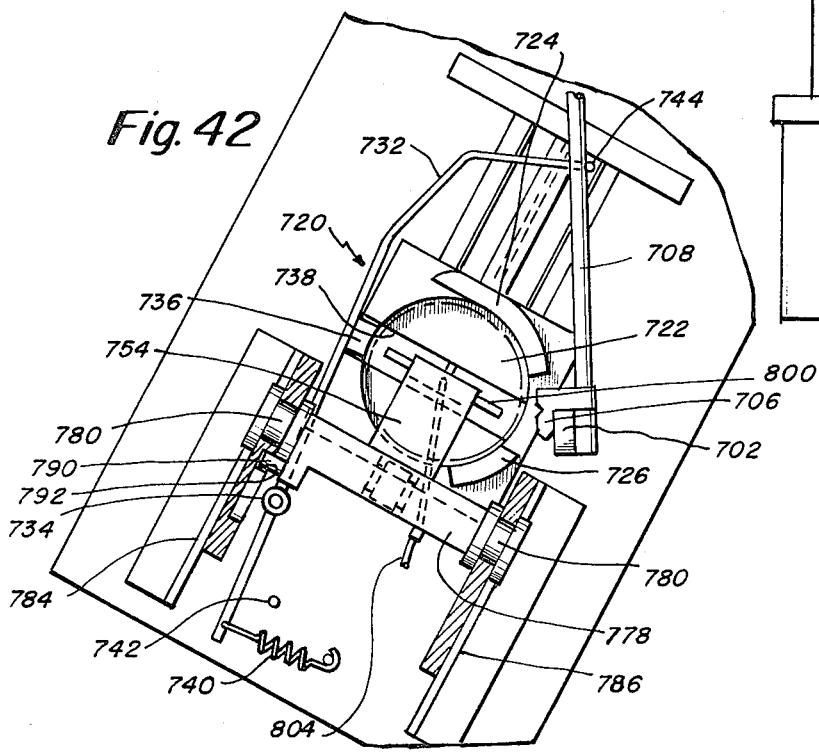

4,339,993

FORTUNE COOKIE MACHINE

BACKGROUND OF THE INVENTION

This invention relates to a machine for automatically making fortune cookies. Heretofor fortune cookies have been made either manually or on semi-automatic equipment which requires the constant attention of one or more attendants. These rather primative techniques for making fortune cookies obviously adversely affect their cost. In accordance with the present invention a machine is provided which wholly automatically makes fortune cookies.

The invention includes a first turret assembly that has a number of separate griddles which are moved step by step in a circular path through several stations. As the griddles move on the turret, they are opened for cleaning and filling, and are closed for baking the cookie blanks. At one station along the path, the opened griddles are cleaned, at another station the griddles are oiled, and at yet another station the cookie batter is poured into the griddles. Thereafter the griddles close, and as they move step by step on the turret they pass through an oven where the cookie blanks are baked. After the baking is completed and while the cookie blanks are still soft and pliable, they are stripped from the griddle and transferred to a stuffing and forming assembly. In the stuffing and forming assembly, a paper slip carrying the fortune message is placed on each blank and subsequently the cookie blank with the slip is folded in half and then folded a second time, and it is finally puckered or crimped to produce the final shape for the fortune cookie. As a last step in the process, the fully formed fortune cookies are stripped from the stuffing and forming assembly. All of these steps are carried out fully automatically, without any special attention or manipulation on the part of an operator.

This invention will be better understood and appreciated from the following detailed description read in connection with the accompanying drawings.

BRIEF FIGURE DESCRIPTION

FIG. 1 is a front elevation view of a machine for baking and forming fortune cookies in accordance with this invention. Parts of the baking oven have been broken away for clarity.

FIG. 2 is a fragmentary top plan view of the machine shown in FIG. 1.

FIG. 3 is an enlarged detail view of one of the griddles forming part of the baking assembly of the machine shown in FIGS. 1 and 2.

FIG. 4 is a fragmentary side elevation view of one of the griddles along with the transfer mechanism for transferring a baked cookie blank from the oven assembly to the stuffer and forming assembly.

FIG. 13 is a fragmentary plan view of the stuffing and forming assembly, showing the mechanism for depositing the strip of paper on which the fortune message is printed, onto the cookie.

FIG. 14 is a fragmentary elevation view, partly in section, taken along section line 14—14 of FIG. 13.

FIG. 18 is an enlarged fragmentary elevation view of the fully formed fortune cookie on the forming assembly.

FIG. 19 is a fragmentary plan view of the turret of the forming assembly and showing the manner in which the fully formed fortune cookies are removed from the machine.

FIG. 21 is a plan view of the mechanism shown in FIG. 20 taken along the sight line 21—21 in FIG. 20.

FIG. 22 is a fragmentary side view on a reduced scale of the transfer assembly and griddle shown in FIG. 20 and illustrating the transfer mechanism in the extended position between the open plates of the griddle.

FIG. 23 is a fragmentary plane view of another embodiment of transfer mechanism and stuffing and forming assembly.

FIG. 24 is a fragmentary cross-sectional view taken on section line 24—24 of FIG. 23 with the transfer mechanism between the griddle plates.

FIG. 25 is a detail view of the transfer assembly in a subsequent position in the stripping sequence.

FIG. 26 is a detail view of the transfer mechanism taken along sight lines 26—26 of FIG. 24.

FIG. 27 is an elevation view of the actuating mechanism of the transfer assembly taken along sight line 27—27 of FIG. 23.

FIGS. 28 and 29 are cross sectional views taken along section lines 28—28 and 29—29, respectively, of FIG. 27.

FIG. 30 is an elevation view of the message slip magazine and message slip transfer device taken along sight line 30—30 of FIG. 23.

Figure 31:
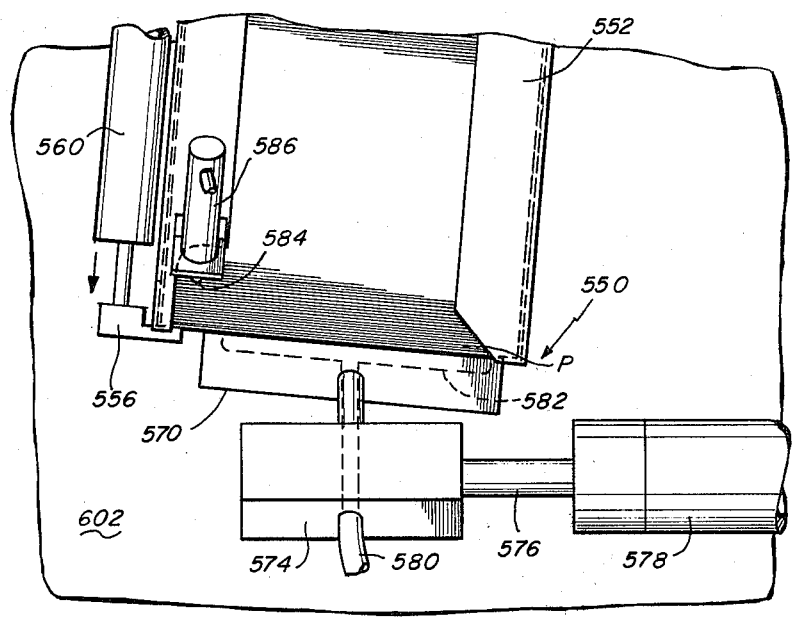

FIG. 31 is an enlarged fragmentary view taken along sight line 31—31 of FIG. 30.

Figure 32:
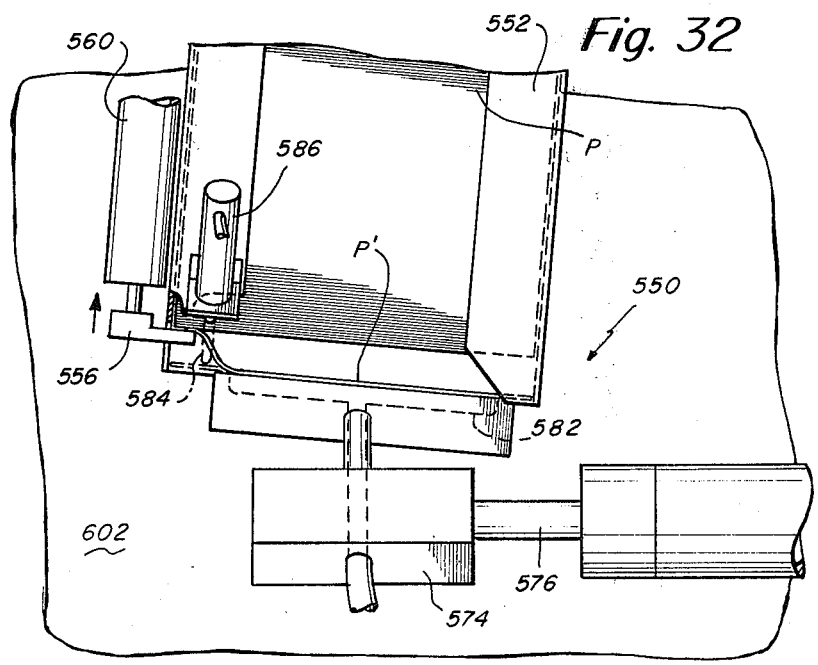

FIG. 32 is a view similar to FIG. 31 but showing the lowermost message slip in the magazine carried on the transfer device.

Figure 33:
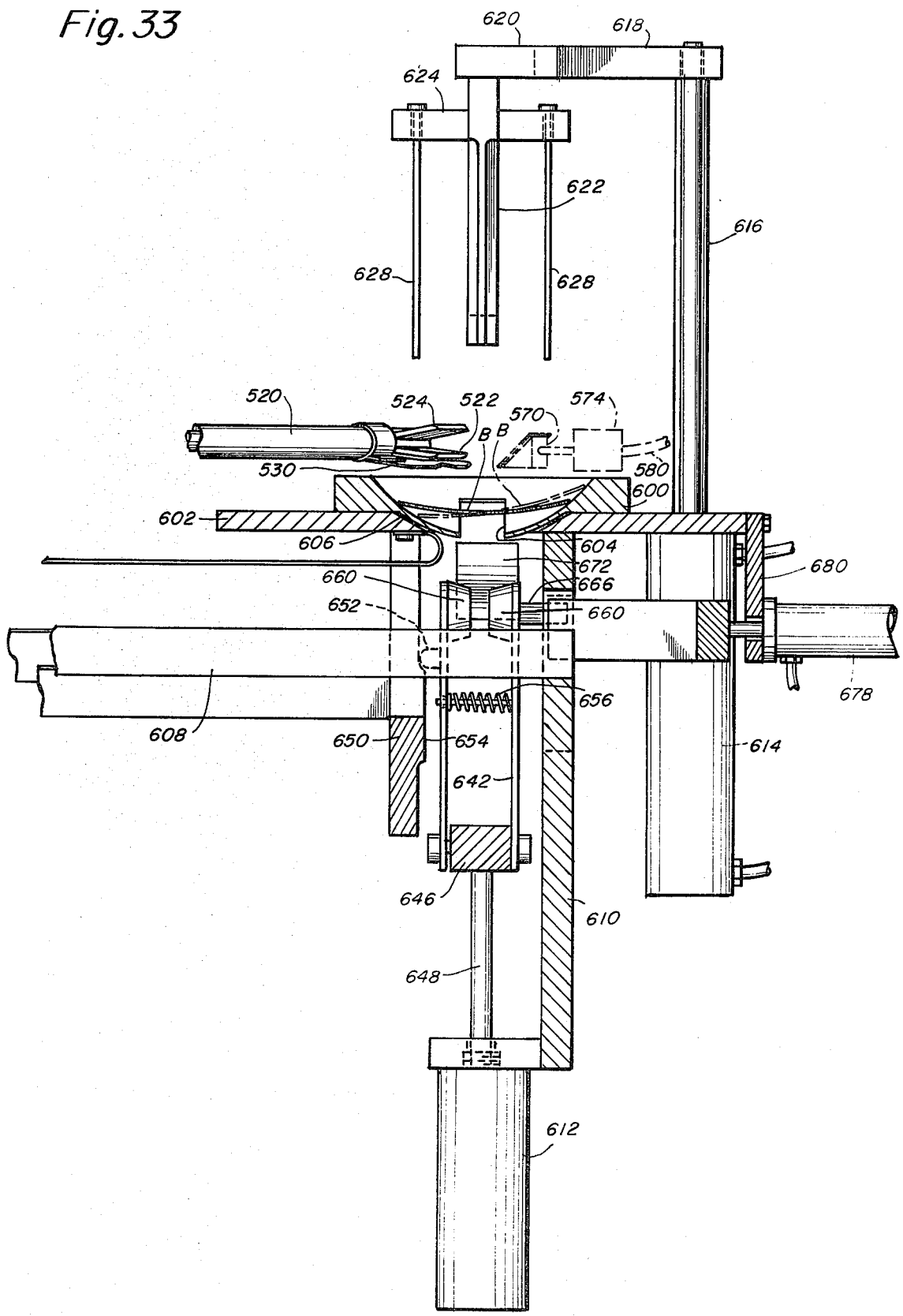

FIG. 33 is an elevation view, partly in section, of the cookie forming assembly taken along section line 33—33 of FIG. 23.

Figure 34:
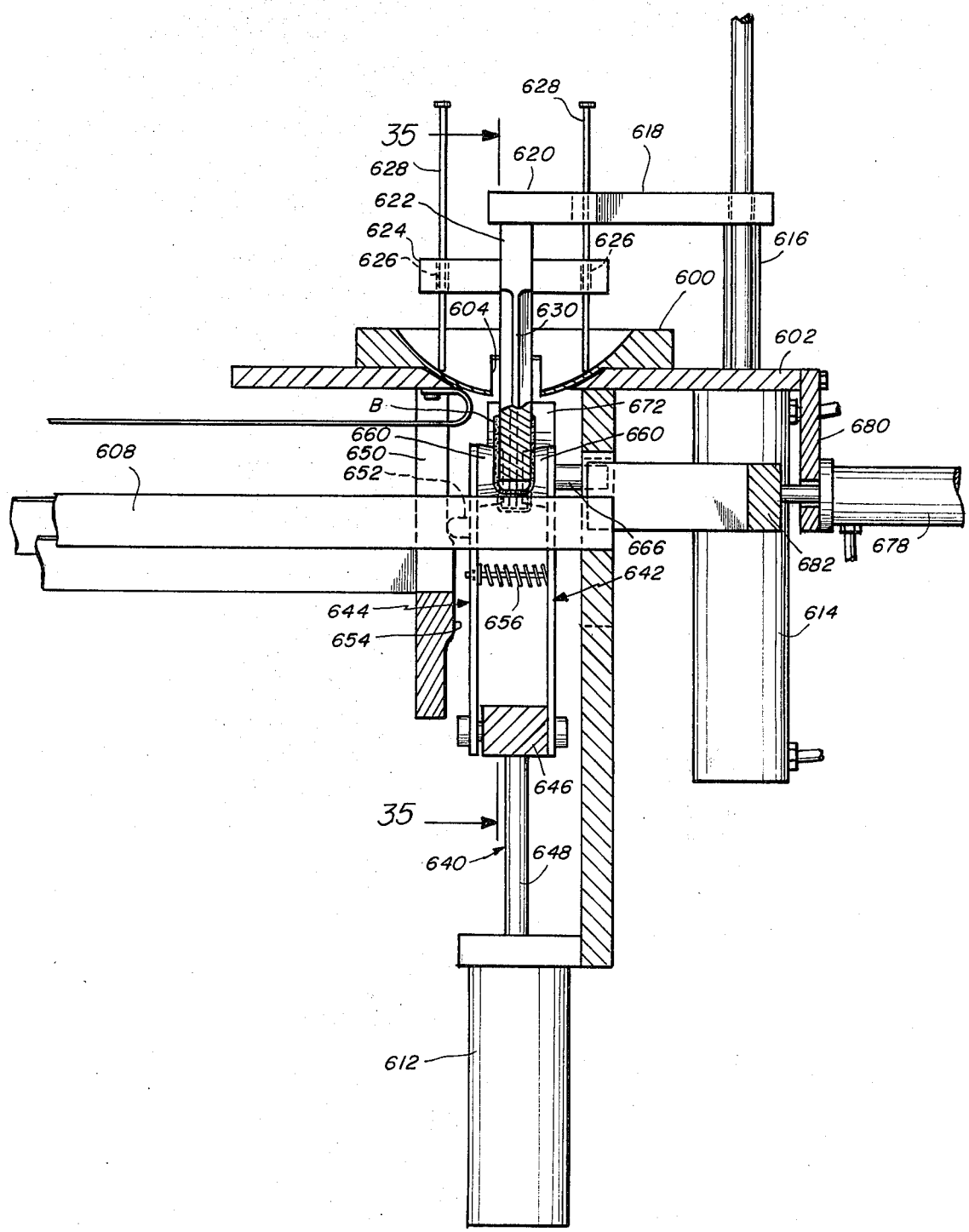

FIG. 34 is a view similar to FIG. 33 but showing the cookie partially formed.

Figure 35:
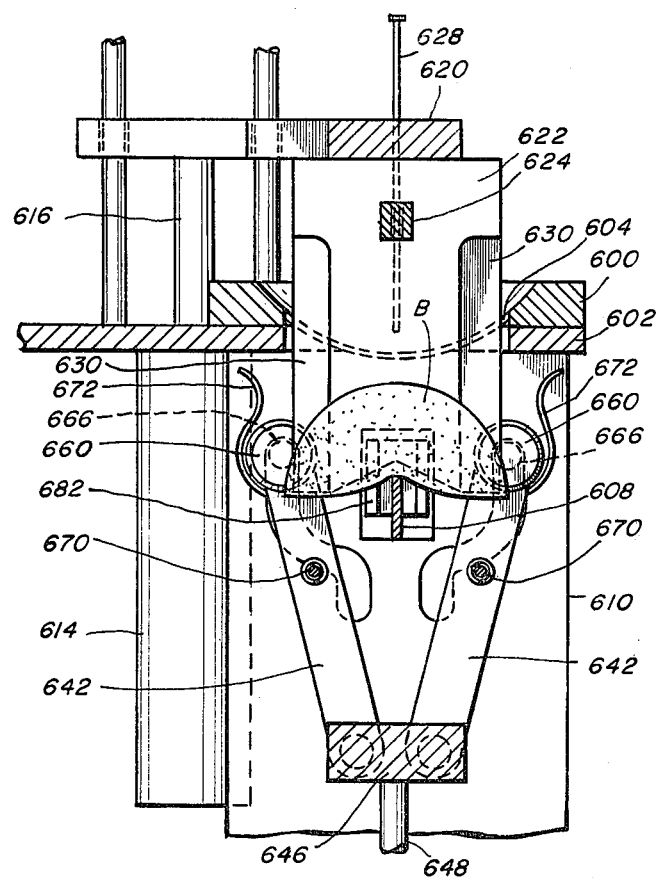

FIG. 35 is a cross sectional elevation view of a part of the cookie forming assembly taken along section line 35—35 of FIG. 34.

Figure 36:
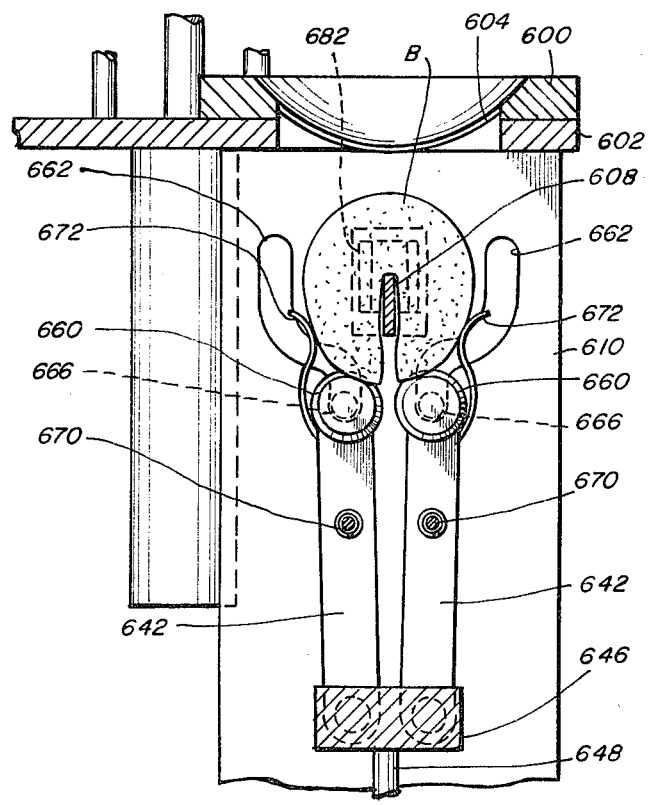

FIG. 36 is a view similar to that of FIG. 35 but showing the cookie fully formed in the assembly.

Figure 37:
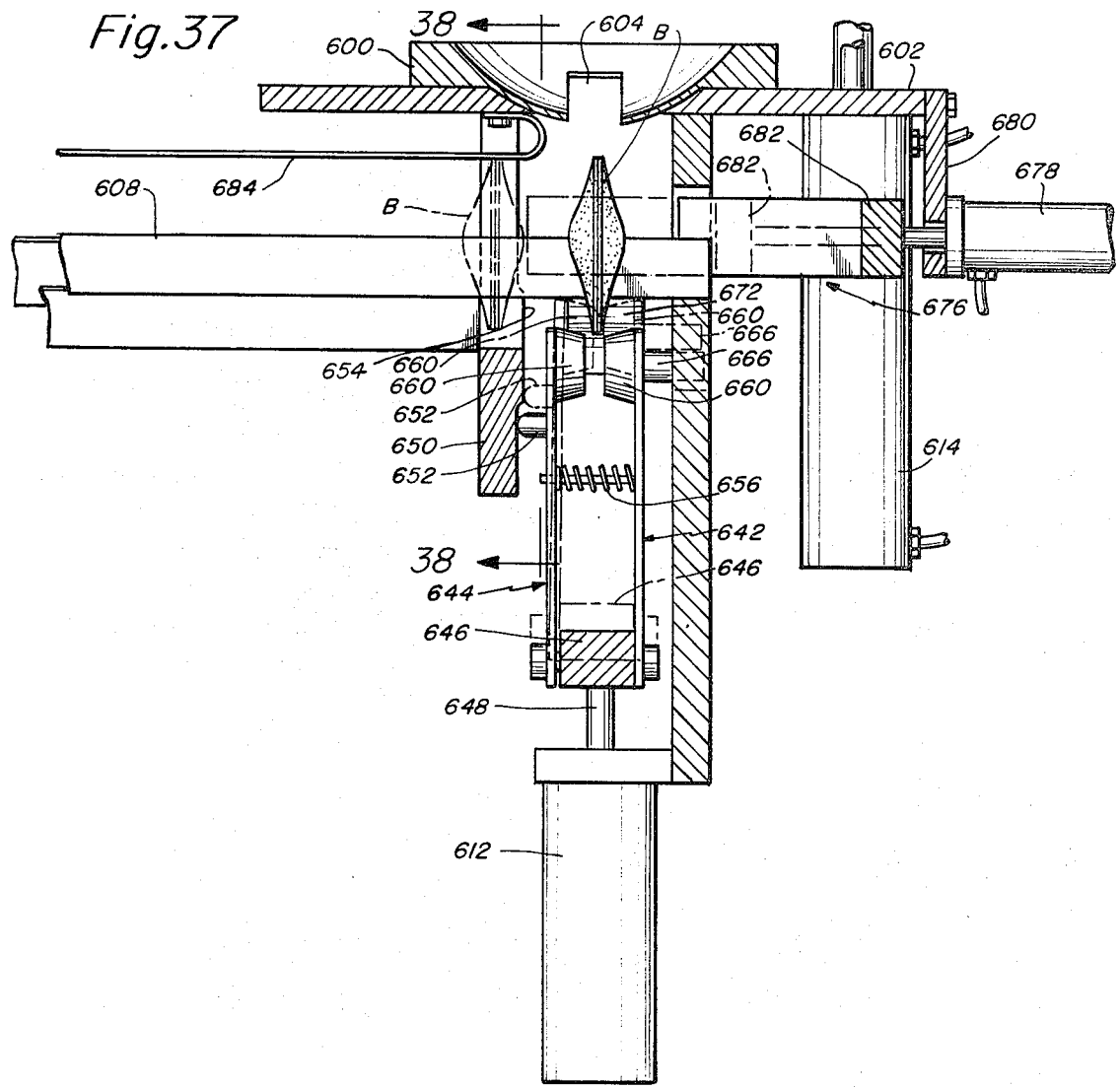

FIG. 37 is a view similar to FIG. 34 but showing the cookie and assembly in the same state and position as in FIG. 36.

Figure 38:
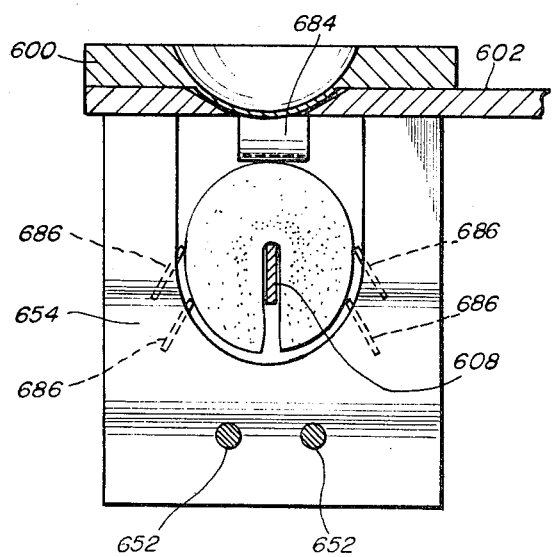

FIG. 38 is an elevation view taken along sight line 38—38 of FIG. 37.

FIG. 39 is a fragmentary plan view of the preferred embodiment of transfer mechanism and stuffing and forming assembly, and also showing the scrapping and oiling mechanism for the griddles.

FIG. 40 is a fragmentary elevation view taken along sight line 40—40 of FIG. 39 and showing the stuffing and forming assembly in position to receive a fortune message slip.

FIG. 41 is a view similar to FIG. 40 but showing the fortune slip magazine withdrawn and suggesting in broken lines the operation of the stuffing and forming assembly, with that assembly in full lines shown in its extreme position.

FIG. 42 is a fragmentary plan view of the stuffing and forming assembly taken along sight line 42—42 in FIG. 41.

Figure 43:
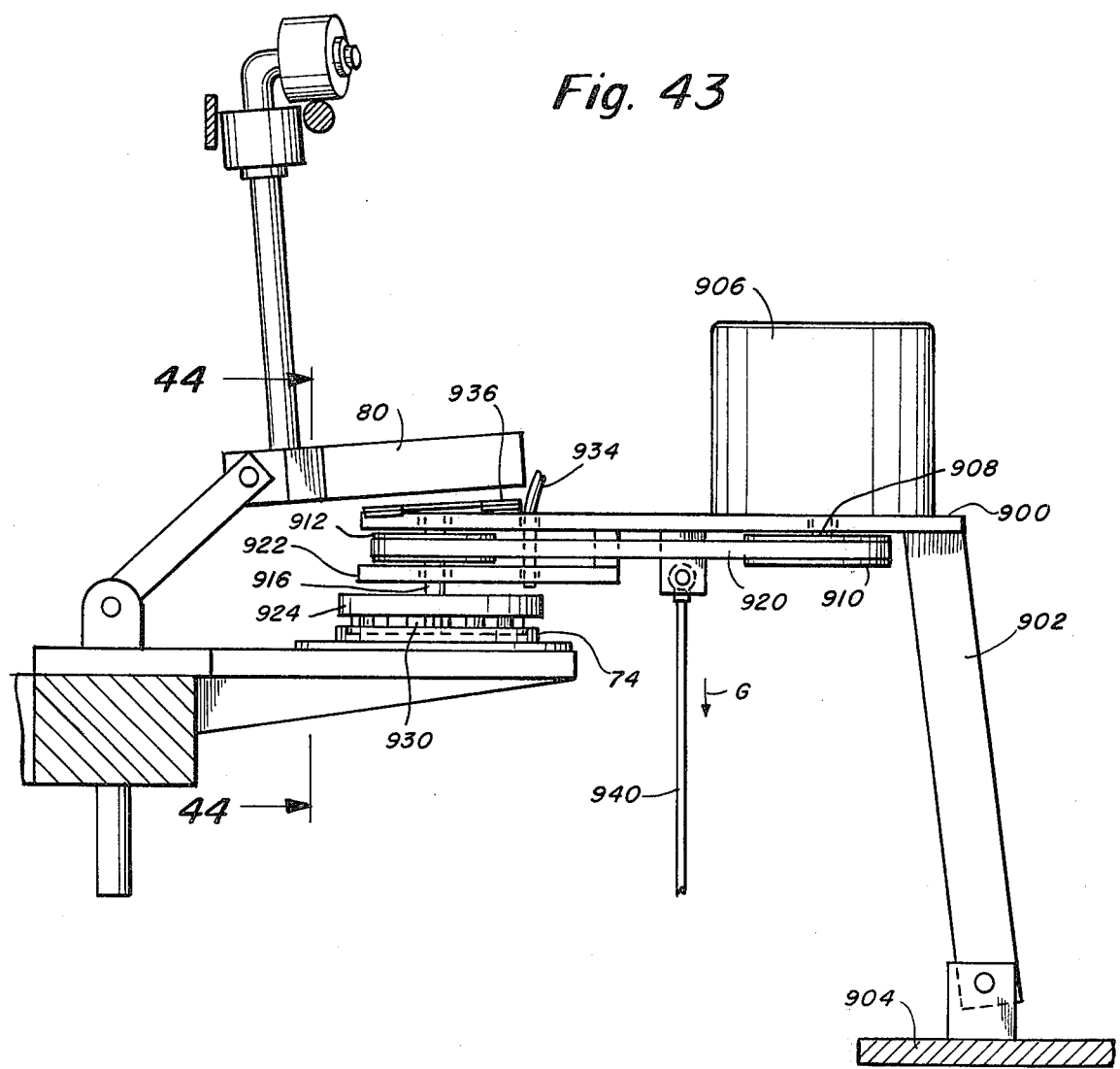

FIG. 43 is a fragmentary elevation view of the scrapping and oiling assembly taken along sight line 43—43 of FIG. 39.

Figure 44:
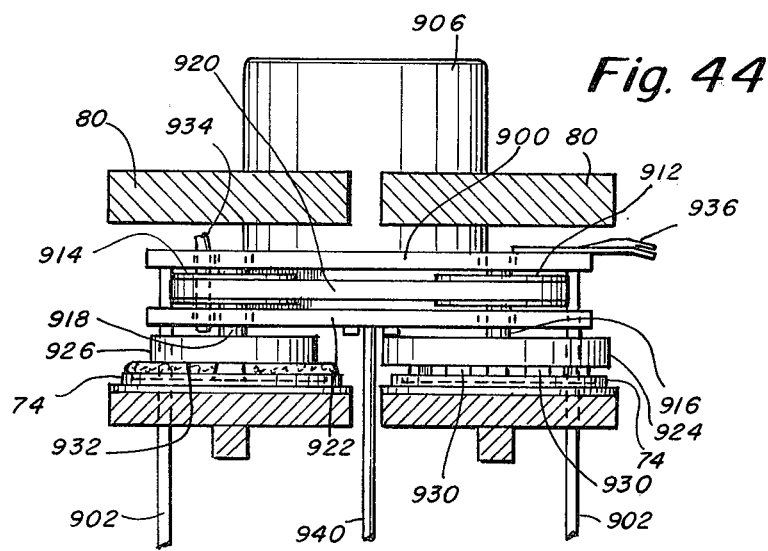

FIG. 44 is a cross sectional view taken along section line 44—44 of FIG. 43.

DETAILED DESCRIPTION

The fortune cookie making machine shown in FIG. 1 includes a baking assembly 30 and a stuffing and forming assembly 32. The assemblies have supporting tables 34 and 36, respectively, and each carries a rotating turret that moves step by step through a series of stations where the various operations take place. Turret 38 of the baking assembly 30 is supported on a shaft 40 which is driven by stepper motor 42. Turret 44 of the stuffing and forming assembly 32 is carried by shaft 46 driven by stepper motor 48. On the baking assembly 30, the batter is deposited on the griddles which form round, flat cookie blanks that are baked in the oven, while in the stuffing and forming assembly 32 the flat paper slips bearing the fortune messages are placed on each of the flat, pliable cookie blanks and thereafter the cookie blanks are shaped to form conventional fortune cookies. The cookie blanks are transported from the baking assembly 30 to the stuffing and forming assembly 32 by the transfer mechanism 45. All of these various steps are described in detail below. The various parts of the machine are described below under the appropriate subheadings.

Baking Assembly

The turret 38 shown in FIG. 2 includes a number of radial, horizontal spokes 60 connected to a rim 62 at their outer ends, and the spokes are connected at their inner ends to a hub (not shown) mounted on shaft 40. Thus, the spokes and rim 60 and 62 respectively which form the turret revolve on shaft 40 under the influence of the stepper motor 42. Locking pins 64 which are carried on the under side of rim 62 are designed to be engaged by a yoke 66 of latching mechanism 63 mounted on the piston rod 68 of cylinder 70 to prevent the turret from rotating. The pins are spaced about the rim 62, 10° apart, which equals the angular distance the turret turns during each step. When the yoke engages a pin as shown in FIG. 3, the turret is locked in position. In order for the turret to turn, the cylinder 70 must retract its piston rod 68 to the left as shown in that figure to release the locking pin 64. The base of latching mechanism 63 is represented schematically in FIG. 1 at 64A.

Rim 62 carries an annular plate 72 which in turn has fixed about its upper surface a number of griddles 78. Each includes a lower griddle plate 74 having a shallow recess 76 in which the individual cookies are formed and baked as flat cookie blanks. Each griddle 78 also includes a top plate 80 hinged by pin 82 to link 84 in turn hinged by pin 86 to bracket 88. The brackets 88 for each griddle are mounted on the upper surface of plate 72 above the rim 62. The upper griddle plate 80 of each griddle 78 carries a vertical post 90 having a horizontal extension 92. The upper end of the post carries a cam roller 94 and the horizontal extension 92 of the post carries a second cam roller 96. As is explained more fully below, the cam rollers 94 and 96 in cooperation with a pair of cam tracks 98 and 100 raise the upper plate 80 off the lower plate 74 as each griddle moves about the assembly through a portion of each revolution of the turret.

The tracks 98 and 100 extend through an arc of approximately 120°. As the turret 38 rotates step by step as suggested by arrow 102 in a counterclockwise direction as viewed in FIG. 2, the cam rollers 94 and 96 first engage the cam tracks at their leading ends 104 and 106, and the tracks gradually rise and move radially inwardly for approximately 60°, and then they return to the same relative positions as the leading ends 104 and 106. As is evident in FIGS. 4 and 7 through 12, the tracks cause the rollers to elevate, incline, and move slightly inward in a radial direction, the upper plate 80 so as to separate the griddle plates for purposes which will be described presently. After being opened to the position shown in FIG. 12, the cam rollers 94 and 96 under the influence of the tracks return the upper griddle plate 80 to the closed position, and through the remainder of the turret travel in each revolution, that is for approximately 240°, the griddle is closed. During that period, the griddles are generally confined within the oven hood 108 where the individual fortune cookie blanks are baked.

As is shown in FIGS. 1 and 2, the hood 108 encloses all but a small segment of the turret 38, essentially where the griddle plates are open. Within the enclosed hood 38 a pair of tubular burners 110 and 112 lie above and below the course of the griddles described by the periphery of turret 38 so as to heat the griddles and bake the cookies in the griddle cavity 76.

In FIG. 2 the latching assembly 63 described above is shown disposed just forward of leading ends 104 and 106 of the cam tracks 98 and 100. The latching assembly 63 is positioned to engage the pins 64 that depend from the rim 62 of the turret beneath each of the griddles. As each griddle moves step by step from the location of the latching assembly 63 to station A which is hereinafter sometimes referred to as the transfer station, the tracks 98 and 100 gradually open the griddles as each leaves the confines of the oven hood. At station A each of the flat cookie blanks is removed from its griddle and transferred to the stuffing and forming assembly 32 by the transfer mechanism to be described presently, and thereafter at stations, B, C and D the griddles are cleaned, oiled, and filled with batter, respectively, before the griddles close and travel the 240° course within the oven for baking. In the embodiment shown, the baking assembly 30 includes griddles, spaced 10° apart, center to center, and the turret rotates through 10° steps so that each stops for a prescribed duration in stations A, B, C and D for removal of the baked cookie blanks, cleaning of the griddles, oiling of the griddles, and the pouring of the batter into the griddles.

Cookie Transfer Mechanism

In FIGS. 4 to 12, the transfer assembly is shown in detail. The assembly is actually supported on the stuffing and forming assembly 32. In FIG. 1 it will be noted that table 36 supports an upper plate 130 by means of legs 132 from which the transfer assembly is cantilevered so as to extend into the course of travel of the griddles at the periphery of the turret 38. The transfer mechanism is generally identified at 45.

The plate 130 of assembly 32 carries a support block 132 from which extend a pair of parallel, horizontal rails 134 and 136 that are joined at their outer ends by a brace 138 disposed in the course of the moving griddles on the assembly 30. Brace 138 actually lies between the lower and upper griddle plates 74 and 80 when the two are separated by the action of the rollers and tracks 94, 96, 98 and 100. This is shown in FIGS. 4 and 7-12. The rails 134 and 136 form a track for a carriage 140 that moves on the rails between the retracted position shown in FIGS. 4 and 5 and the extended position shown in FIGS. 7 and 8. The carriage is moved by a cylinder 142 mounted on support block 132. The piston rod 144 of cylinder 142 is connected directly to the carriage through support block 132, as is evident in FIGS. 4 and 5.

Figure 5:
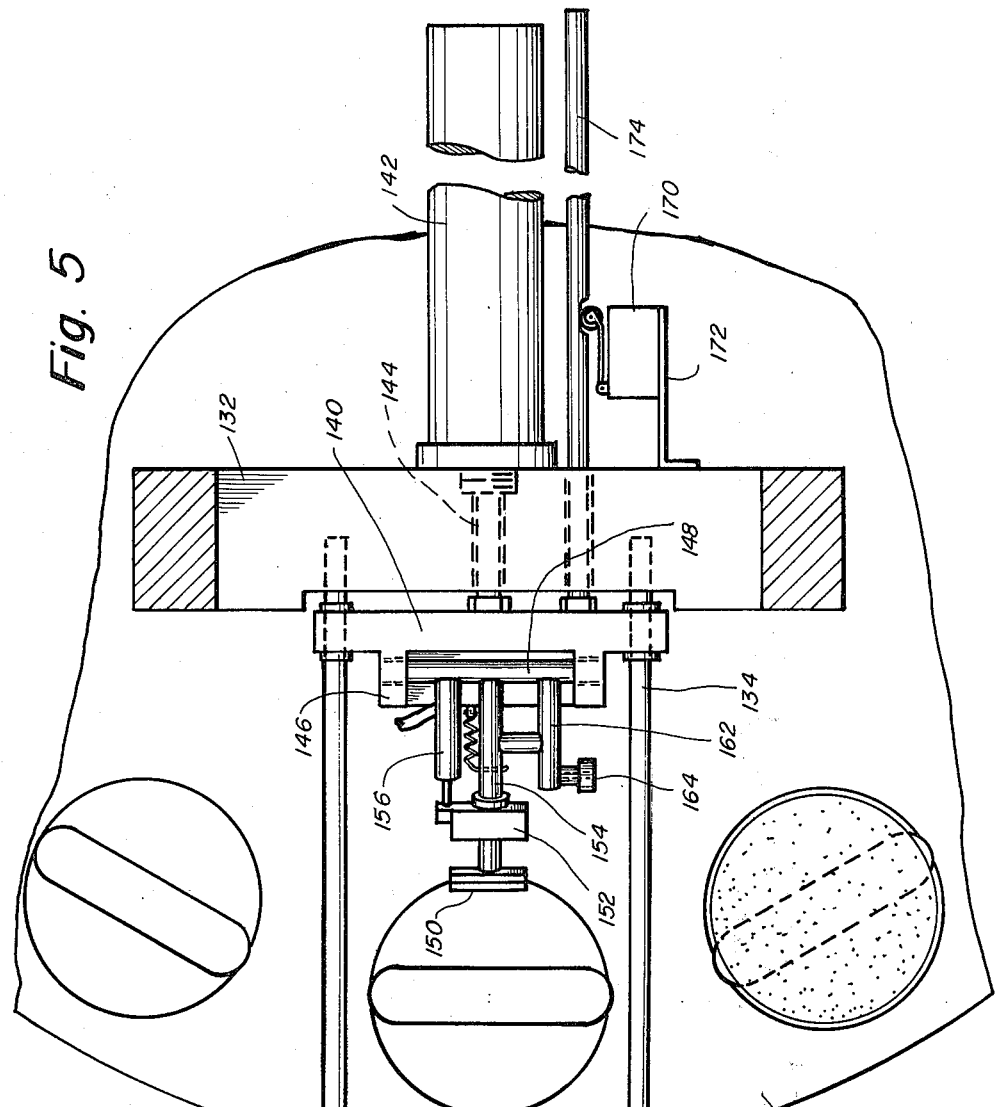
FIG. 5 is an enlarged plan view of the transfer mechanism shown in FIG. 4.

Carriage 140 has a pair of ears 146 that support pivot shaft 148 which in turn carries the scraper 150 and gripper 152 that actually remove and transfer the flat cookie blanks from the griddles to the stuffing and forming assembly 32. Scraper 150 is mounted on the end of arm 154 on which the gripper 152 is slidably mounted. The gripper may be moved from an open or inactive position as shown in FIGS. 4 and 5 to the gripping position shown in FIGS. 9-11 for actually grasping the cookie blank. The gripper is actuated by a small air cylinder 156, which is also carried on pivot shaft 148. A coil spring 158 is connected between the bottom of carriage 140 and arm 154 so as to urge the scraper 150 and gripping finger 152 in a downward direction as shown in FIG. 4 wherein the arm 154 engages the edge 160 of the carriage. The edge 160 serves as a stop to limit the action of spring 158. Second arm 162 also mounted on pivot shaft 148 carries a cam roller 164 that cooperates with a cam assembly 166 on brace 138 to pivot scraper 150 and gripper 152 upwardly against the bias of spring 158 on shaft 148 when the carriage moves to the extended position shown in FIG. 12. This upward pivotal movement of the scraper and gripper causes the scraper to engage the lower surface of the upper griddle plate 80 so as to peel the cookie blank from that surface. When the griddle plates are separated in the baking assembly after baking is completed, the cookie blanks tend to adhere to the upper rather than the lower griddle plate, and therefore the blanks must be removed from that plate to be transferred to the stuffing and forming assembly. The operation of the air cylinder 156 which controls gripper 152 is in turn controlled by a microswitch 170 carried on bracket 172 on support block 132. The microswitch 170 cooperates with a timing rod 174 carried on and which travels with carriage 140, as is evident in FIG. 5.

Figure 6A:
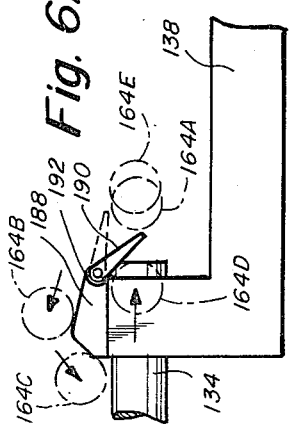
FIGS. 6A and 6B are fragmentary elevation views taken along the sight lines 6A—6A and 6B—6B in FIG. 5.
Figure 6B:
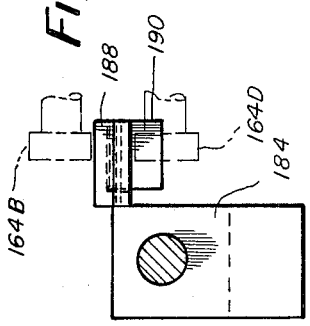

Brace 138, as shown in FIGS. 5, 6A and 6B, is generally U-shaped having a pair of arms 180 and 182 with upturned fingers 184 and 186 respectively, which in turn are connected directly to rails 134 and 136. Finger 184 supports the cam mechanism 166 that includes a cam 188 positioned in the path of travel of the cam roller 164, and the cam 188 and roller 164 together control the elevation of the scraper 150 and gripper 152 as suggested above. The operation of the cam roller 164 and cam 188 is illustrated in FIGS. 6A and 6B.

The cam 188 carries a pivotally mounted ramp 190 on its rear edge 192, which causes the roller 164 to climb up onto the cam when the carriage moves in one direction and allows the roller to move beneath the cam 188 when the carriage moves in the other direction. Specifically, as the carriage 140 moves to the left as viewed in FIGS. 5 and 7 (and to the right as viewed in FIG. 6A), to place the scraper 150 in its extreme outward position between the griddle plates, roller 164 passes beneath the cam 188 and pivots the ramp 190 upwardly as suggested in FIG. 6A so as to allow the roller to pass beneath it. Therefore, when the scraper 150 moves to the left as viewed in FIGS. 5 and 7 and enters between the griddle plates, the scraper is spaced from the upper griddle plate 80 and does not touch it. Having reached its extended position, however, the scraper must then be elevated so as to engage the lower surface of the upper griddle plate 80 and begin to peel the cookie blank from the griddle plate. Therefore, as the carriage 140 begins to retract under the influence of cylinder 142, cam roller 164 engages ramp 190 which is in the down position so that the roller rides up on the ramp and over cam 188 to raise the scraper and gripper. Roller 164 follows the course represented by the phantom showings of the roller at 164A, 164B and 164C in FIG. 6A so as to turn the pivot shaft 148 and the scraper and gripper carried on it. The path of the roller 164 on the outward portion of the stroke is represented by the phantom showing of the roller at 164D and 164E in FIG. 6A.

Figure 7:
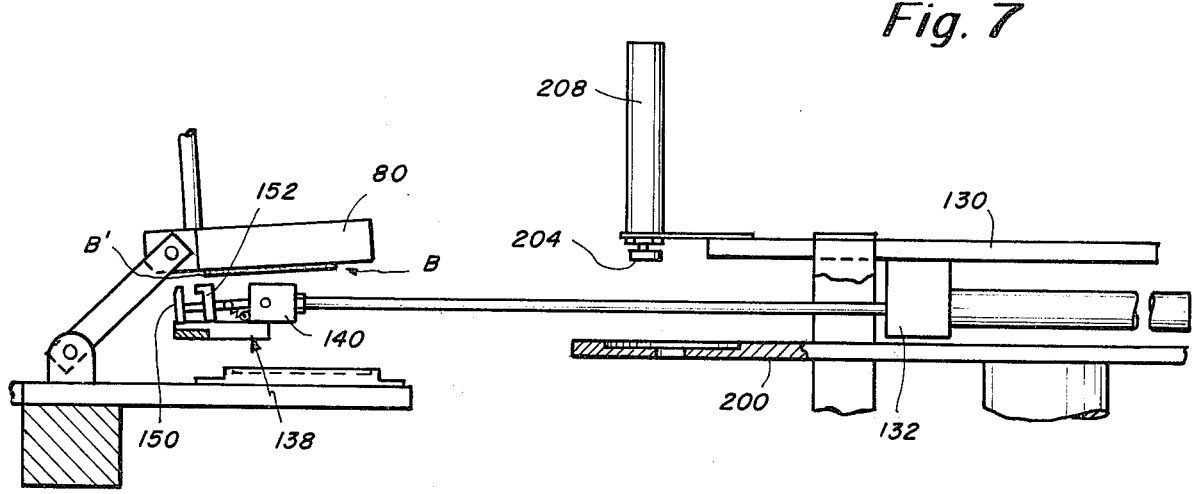
FIGS. 7 to 12 are fragmentary views on a reduced scale similar to FIG. 4 and showing the various stages of operation of the transfer mechanism which strips the flat, baked cookie from the griddle and deposits it on the stuffing and forming assembly of the machine.
Figure 8:
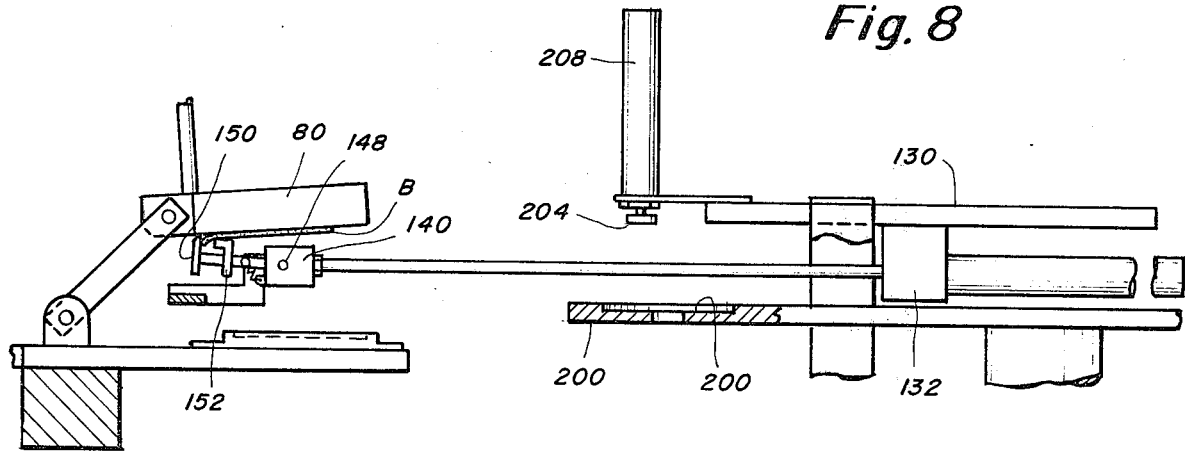
Figure 9:
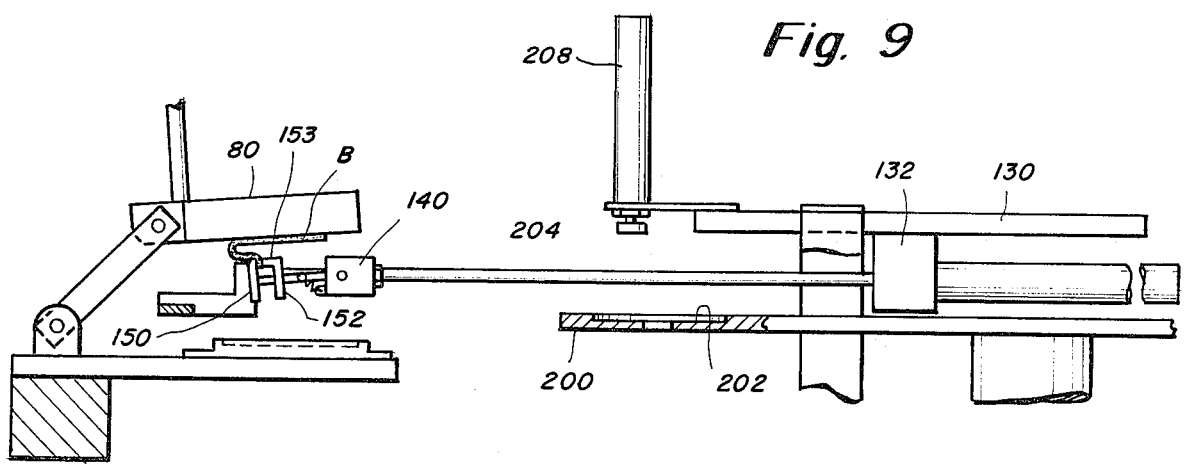
Figure 10:
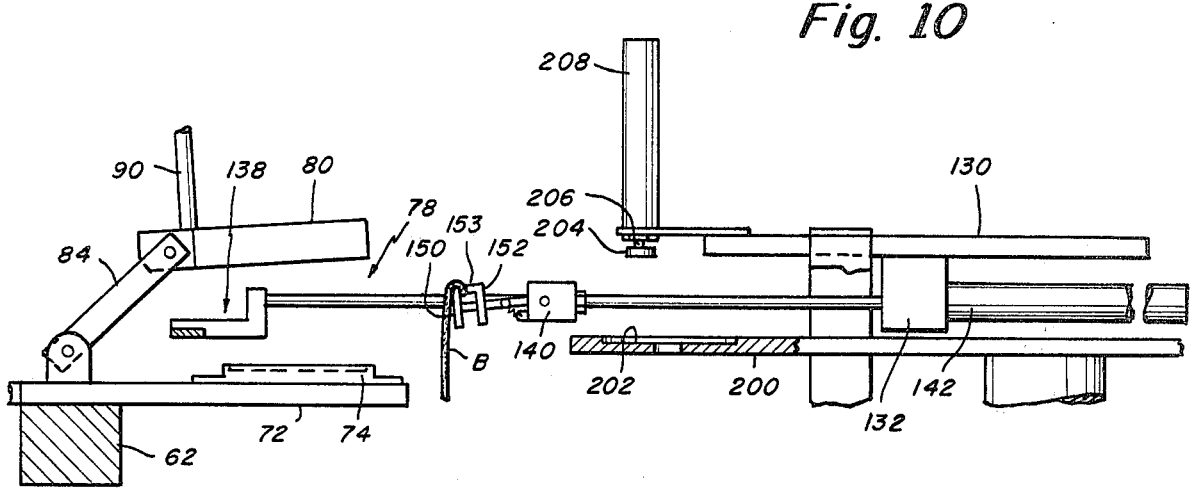

In FIG. 7 carriage 140 is shown in the extended position with the scraper 150 and gripper 152 in the open position as well as in the lower position with respect to upper griddle plate 80 and the cookie blank B. In FIG. 7 the carriage is at the maximum extended position, and scraper 150 is actually located beyond the edge $B^1$ of cookie blank B. As the carriage begins to move to the right as viewed in FIG. 7, cam roller 164 and cam assembly 166 causes the pivot shaft 148 to turn clockwise so that the upper edge of scraper 150 engages the lower surface of plate 80 and begins to peel the cookie blank from the surface. This action is shown in FIG. 8. Simultaneously, the gripper 152 begins to move toward the scraper 150 so as to grasp the edge $B^1$ of the cookie blank against the scraper. In this manner the transfer mechanism peels the cookie blank from the lower surface of griddle plate 80 as the carriage moves to the right in a retracting direction as shown in FIGS. 9 and 10. When the cookie blank is being removed, it is fully baked but soft and pliable, and therefore it can be peeled from the upper griddle plate 80 as suggested in the drawings. The gripper 152 has a flange 153 at its upper edge which actually engages the lower surface of the cookie blank and squeezes its edge against scraper 150. It will also be noted in FIG. 9 that as the carriage 140 moves to the right, the shaft pivot 148 is allowed to pivot in a counterclockwise direction under the influence of spring 158 as the cam roller 164 falls off cam 188 so as to lower the scraper 150 and gripper 152 to further assist in peeling the cookie blank from the upper griddle plate. Once the blank has been removed from the griddle, it hangs from the scraper and gripper as shown in FIG. 10 as the carriage moves to the right.

Figure 11:
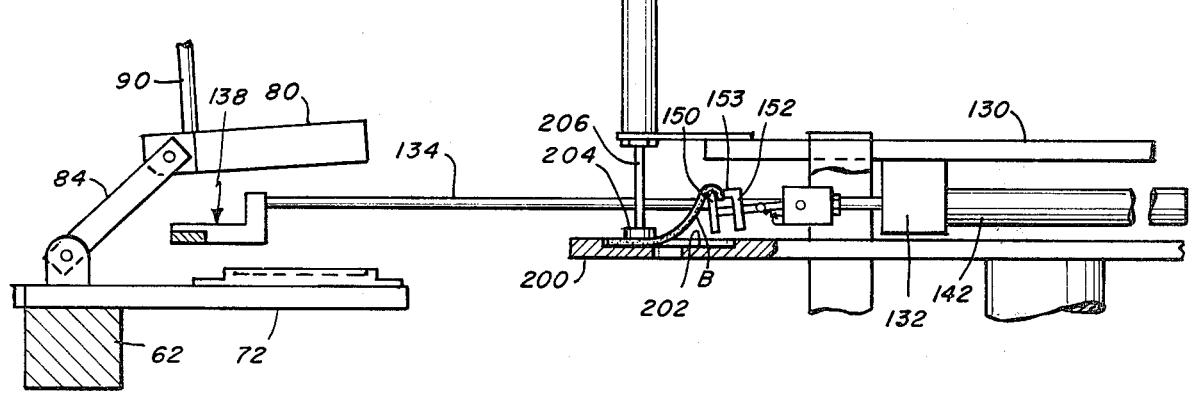
Figure 12:
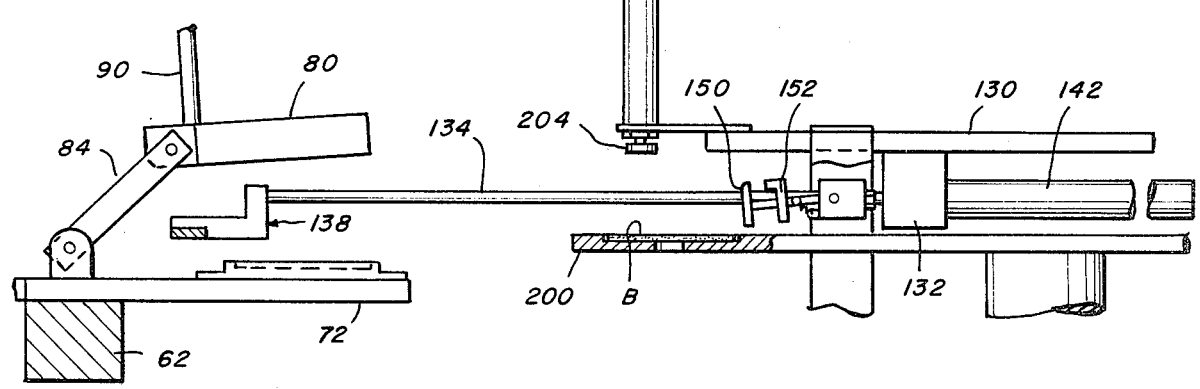

In FIGS. 11 and 12 the cookie blank is shown being deposited on the upper turntable 200 of the stuffing and forming assembly 32. The turntable includes a series of recesses 202 about its periphery, and as the hanging cookie blank B is drawn over the turntable 200 and across the recess 202 disposed in station E aligned with the transfer assembly, the foot 204 on piston rod 206 of cylinder 208 engages the trailing edge of the blank as shown in FIG. 11 aso as to hold the cookie blank in the recess. The gripper 152 is retracted away from the scraper 150 so that the blank is released and allowed to fall into recess 202. Cylinder 208 is shown supported on plate 130 as part of the transfer mechanism.

Stuffing and Forming Assembly

Figure 15:
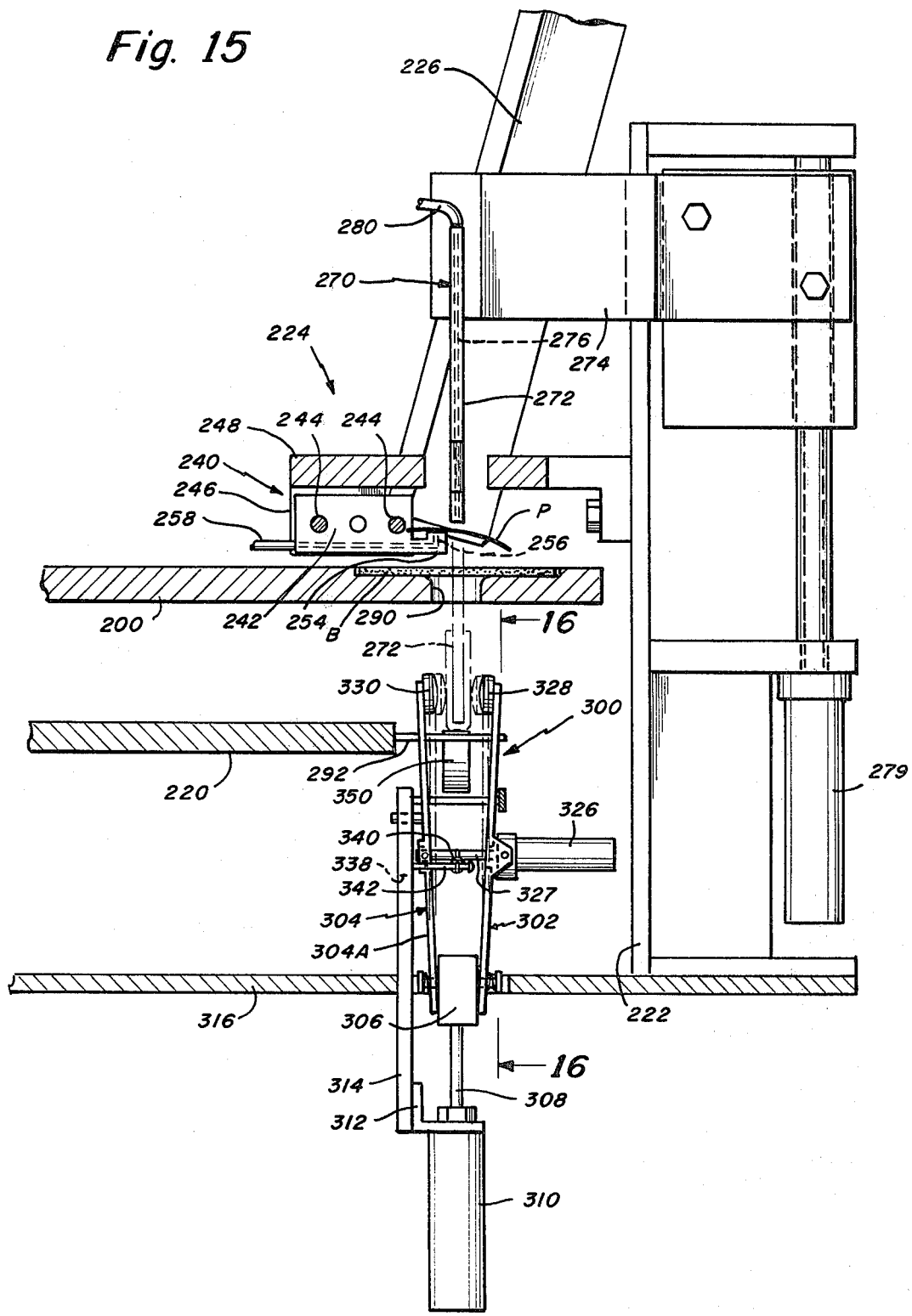
FIG. 15 is a elevation view of a portion of the stuffing and forming assembly.

The table 36 as described above carries turret 46 driven by stepper motor 48. Turret 44 not only includes upper circular turntable 200 but a second lower turntable 220, and both are moved in tandom step by step in response to the stepper motor 48. Disposed beside the rotating turntables 200 and 220 on table 36 is a vertical post 22 that supports the stuffing assembly 224 that deposits the paper slips bearing the fortune message on the cookie blanks carried in the cavities 202 of the upper turntable 200. The paper slips themselves are fed from a magazine 226 mounted on bracket 228 in turn attached to post 222. Magazine 226 is somewhat inclined as shown in FIGS. 14 and 15 and carries a presser foot 230 which is slidable inside the magazine and which is spring loaded by means of spring 232 to force the foot in a downward direction. The individual paper slips within the magazine, shown at P in FIG. 14, are supported from below by means of the inturned lips 234 along the bottom edges of the magazine sides 236, and the presser foot 230 urges the paper slips P against the lips 234 in a position to be removed one at a time from the magazine bottom 237 which is open.

The fortune message paper slips P are removed from the bottom of magazine 226 by a vacuum feed mechanism 240 shown in FIGS. 13-15. The mechanism 240 includes a vacuum head 242 slidably mounted on rails 244 in turn supported on bracket 246 suspended below platform 248. Bracket 246 also supports cylinder 250 whose piston rod 252 is connected to head 242 to move it on the rails 244. Head 242 is movable between a retracted position shown in full lines on the right in FIG. 13 and an extended position suggested by broken lines on the left in that figure.

In FIG. 15 head 242 is shown to include a finger 254 having a port 256 on its upper surface connected to a vacuum line 258. When the cylinder 250 withdraws the head 252 to the full line position shown in FIG. 13, finger 254 engages the lowermost paper slip P in the magazine 226, and when a vacuum is applied by line 258 to port 256, the lower slip is literally pulled from the magazine as the head moves toward the extended broken line position. It will be noted in FIG. 13 that when the head 242 is in its extended position, the paper slip P lies over the center of the cookie blank B disposed in the recess 202 in circular turntable 200.

A second vacuum carrier 270 having a head 272 is mounted above the upper circular platform 200 and is provided to carry each paper slip P from the first vacuum head 242 onto the cookie blank B in the recess 202 and thereafter begin the shaping of the fortune cookie into its final form. The second vacuum assembly 270 is carried on a bracket 274 secured to post 222.

In FIG. 13-15 a vacuum line 276 is shown to extend through head 272 and terminate in a port 278 on the lower edge of the head. The head itself is in the form of a thin vertical plate oriented generally perpendicular to the head 242 (see FIGS. 13 and 15), and as head 272 moves vertically downward from the position shown in FIG. 15, it is designed to take the pepr slip P from the finger 254 of head 242 and deposit it on the cookie blank B. This is made possible by the controls for each of the vacuum heads. It is to be understood that when the head 272 engages the paper slip P, its vacuum through line 276 and duct 280 is activated while the vacuum on finger 254 in head 242 is deactivated, so that the paper slip may be freely transferred from head 242 to head 272. The head 272 itself is actuated vertically by cylinder 279 between the elevated position shown in full lines in FIG. 15 and the position suggested in broken lines in that figure.

As described above, the upper turntable 200 is provided with a series of recesses 202 about its periphery, and each recess is shown in FIGS. 2, 4, 5 and 13-15 to have a transverse slot 290 formed in its bottom surface that extends through the turntable 200. The slots extend across the full diameter of the recesses and are aligned with the head 272 when in station F. The slot formed in each of the recesses permits the head 282 to push the cookie blank downwardly through the turntable causing it to fold up along the sides of the head and sandwich the paper slip bearing the fortune message within the fold. The lower extremity of the stroke of head 272 is disposed immediately above the folding pin 292 carried on the periphery of lower turntable 220. A forming subassembly 300 composed of a number of fingers disposed on each side of the head 282 takes the once folded cookie blanks, containing the paper slips, from the head 282 and completes the shaping operation. The forming subassembly 300 is shown in FIGS. 1 and 15-17.

The forming subassembly 300 is composed of two pairs of fingers 302 and 304 that are pivotally mounted on opposte sides of block 306 carried on the upper end of piston rod 308 of cylinder 310. Cylinder 310 is supported on bracket 312 carried on vertical plate 314 secured to the table top 31.

Figure 16:
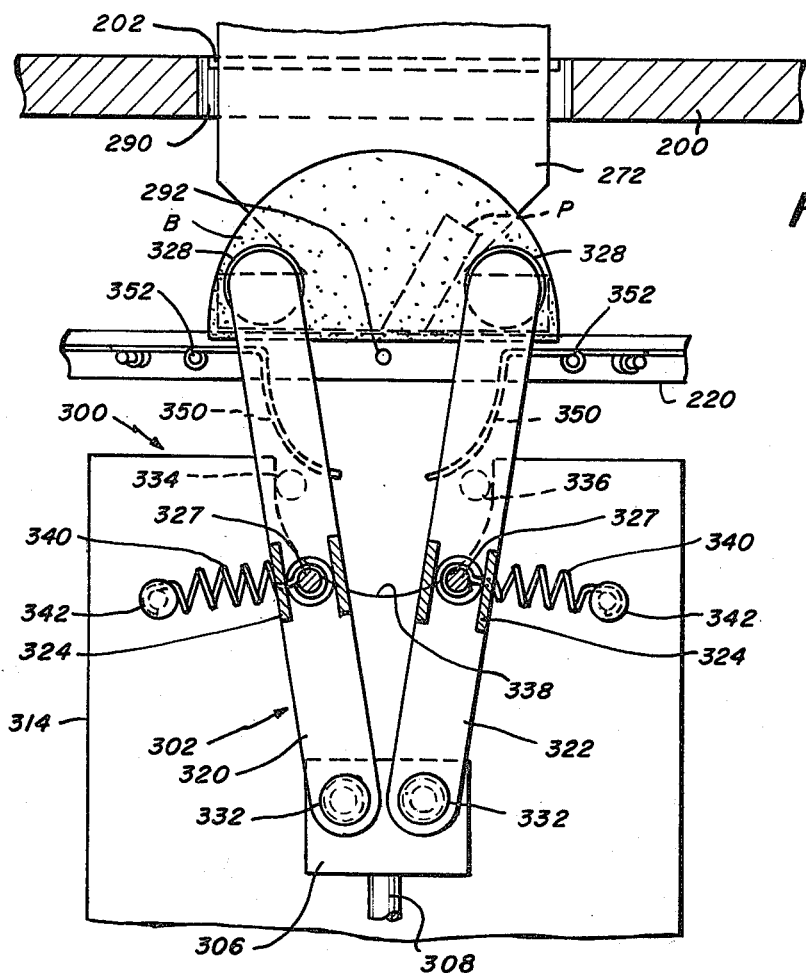
FIG. 16 is a fragmentary elevation view of the forming assembly taken along sight line 16—16 of FIG. 15.
Figure 17:
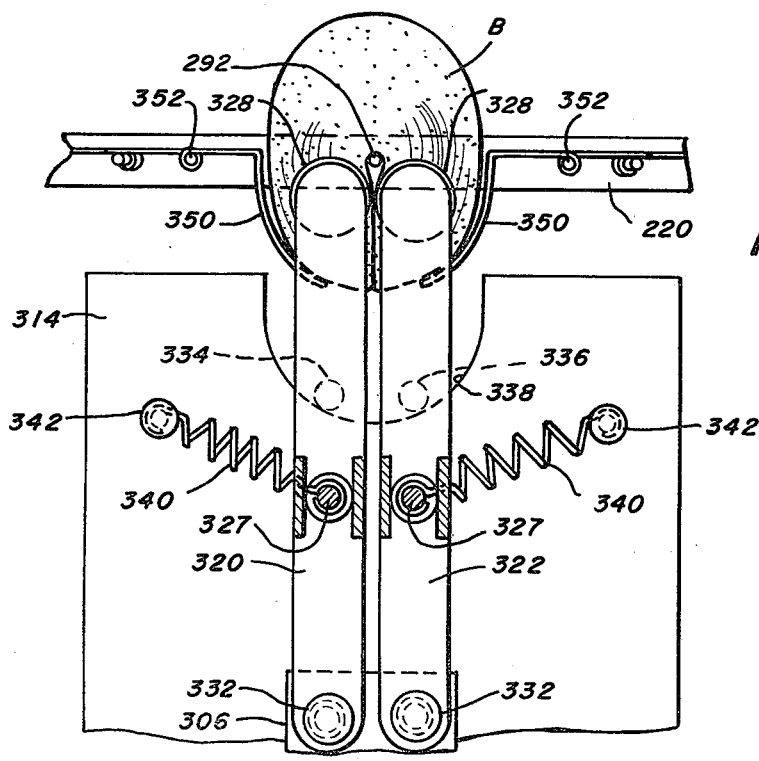
FIG. 17 is a fragmentary view similar to FIG. 16 but showing the mechanism in a subsequent position.

The pair of fingers 302 is composed of left and right fingers 320 and 322 as viewed in FIGS. 16 and 17, and the pair of fingers 304 is composed of left and right fingers which mirror the fingers 320 and 322. As viewed in FIGS. 15 and 16, each of the fingers 320 and 322 carries a bracket 324 that supports an actuating cylinder 326 whose piston rod 327 extends through the respective finger on which it it mounted, to the opposite finger of the other pair 304. The cylinders 326, when actuated, are designed to draw the opposite fingers toward one another so that their presser pads 328 and 330 may engage the folded cookie blank and draw the blank off the head 272 and downwardly about the pin 292 carried on the periphery of lower turntable 220. Note in FIG. 15 that piston rod 326 of the cylinder 326 shown is connected to finger 304A.

The fingers of each pair are also designed to be able to pivot about their supporting pins 332 toward and away from one another as represented by the positions of the fingers of pair 302 in FIGS. 16 and 17. The finger 304 and its companion finger (not shown) carry cam pins 334 and 336 respectively, which cooperate with a track 338 formed in the support 314. As piston 310 draws the subassembly 300 downwardly, the cam pins 334 and 336 cause the fingers of each pair to pivot toward one another by virtue of the shape of the cam track 338. The piston rods 327 of cylinders 326 cause the opposite fingers of the other pair 302 to move in tandom under the influence of the pins 334 and 336 and track 338 so that the fingers on each side of head 272 move together simultaneously as the subassembly 300 lowers in response to actuation of cylinder 310. The fingers of each pair are urged apart by the tension springs 340 connected between the piston rods 327 and fixed pins 342 mounted on the vertical support 314.

The forming assembly also includes several pairs of arcuate fingers 350 pivotally supported on the periphery of lower turntable 220 by pivot pins 352. The fingers may be formed from narrow steel bands which circle about the pivot pins 352 and engage the pivot pins of their next adjacent pairs of fingers in the adjacent forming assemblies on the periphery of the lower turntable 220. A coil spring may be secured to each finger about its pivot pin 352 so as to urge the fingers to the position shown in FIG. 16. However, the fingers may be pivoted apart against the bias of those springs by the pads 328 and 330 on the dns of the several forming fingers making up the pairs 302 and 304.

It will be appreciated that the forming fingers 302 and 304 cooperate with the folding pin 292 between them and the arcuate fingers 350 to shape the fortune cookie into its final, intended configuration. This operation is carried out in the following manner. Head 272 moves from the raised position above upper turntable 200, in a downward direction, and carries the paper slip P with it against the top of the cookie blank B disposed in the recess 202 positioned beneath the head by the step by step rotation of turret 44. Thus, the turret moves each recess from station E where each receives a cookie blank through arc steps of 30° until each reaches station F, where the cookie blanks are removed from the recess by the assembly just described. When the head 272 moves downwardly through the transverse slot 290 and carries the cookie blank with it, the pairs of fingers 302 and 304 are in their elevated and spread apart positions as shown in full lines in FIGS. 15 and 16. The head 272 carries the once folded cookie blank containing the paper slip to the position shown in FIG. 16, and when the head 272 reaches that lower position, the opposite pairs of fingers are pressed together under the influence of cylinders 326 so as to grasp the semicircular sides of the folded cookie blank. Next, cylinder 310 draws the forming subassembly 300 downwardly, which causes the pairs 302 and 304 to slide the folded cookie off the head 272 and fold it a second time about the folding pin 292. The downward action of the pairs of fingers also causes the fingers of each pair to close together to the position shown in FIG. 17, so as to further form the cookie. The cookie which during this period is still soft and pliable engages the arcuate fingers 350, and the swelling and memory of the dough as the cookie cools causes the cookie ultimately to assume the configuration shown in FIG. 18. This occurs when the pairs of fingers again separate under the influence of cylinders 326 so as to release the cookie from the pads. When that occurs, the cookie is supported only by the folding pin 292 and the arcuate fingers 350. With the fingers still in the lowermost position under the influence of cylinder 310, the turret is free to move another step to bring the next recess 202 in the upper turntable 200 into station F where the next fortune cookie may be stuffed and formed. With the next recess in position, the piston 310 may again elevate the subassembly 300, and the cycle described above may be repeated.

Cookie Removing Subassembly

In FIG. 19 the apparatus for removing the fully formed cookies from the turret 44 is shown. It will be noted that a fully formed fortune cookie FC is shown in station F, and that previously formed fortune cookies are shown disposed circumferentially ahead of that station on the folding pins 292 and fingers 350 on the periphery of lower turntable 220. As the fully formed fortune cookies FC move counterclockwise as viewed in FIG. 19 toward station G, the cookies are allowed to cool. A fan may be provided to expedite this action.

A stripping cam 360 is mounted beyond the periphery of turntable immediately above the plane of the folding pins 292 and extends through an arc of approximately 90°. The stripping cam 360 is shown supported on a pair of blocks 362 and 364, and the shape of the cam is such that between its leading end 366 and its trailing end 368 its spacing from the periphery of turntable 200 gradually increases so that near the trailing end 368 the stripping cam is very close to the radial extremity of the folding pins 292 as they approach that location. Consequently, as the plate 220 moves in its 30° increments in the direction of arrow 370, the fully formed fortune cookies FC are gradually pushed radially outward on their respective folding pins 292 and off the arcuate fingers 350 until they are free of the pins 292 and are allowed to fall onto a belt (not shown) or some other device for packaging the individual cookies.

Alternative Embodiment of Transfer Mechanism

Figure 20:
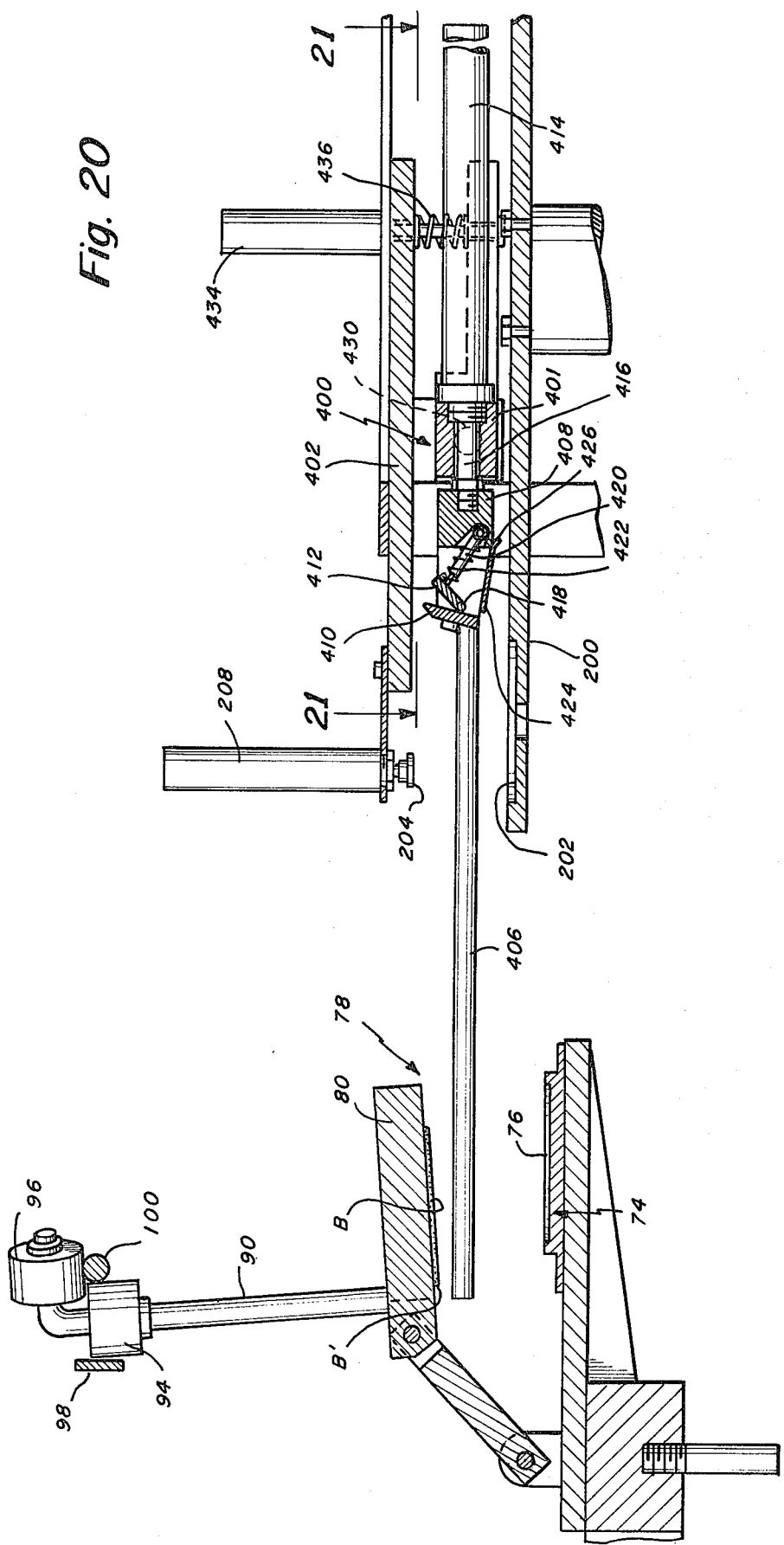
FIG. 20 is a fragmentary side view similar to FIG. 4 and showing an alternative embodiment of transfer mechanism.

FIG. 20 is similar to FIG. 4 but shows a modified transfer mechanism for carrying the baked but pliable cookie blanks from the griddle 78 to the upper turntable 200 of the stuffing and forming assembly. The griddle structure 78 shown in FIG. 20 is identical to that shown in FIG. 4 and will not be described again.

The transfer mechanism 400 is mounted on a support 401 disposed below the bottom of plate 402. The support 401 carries a pair of horizontal rails 404 and 406 that extend into the path of the rotating griddles 78 of the baking assembly, just as do the rails 134, 136 of the preferred embodiment of FIG. 4. The rails in turn slidably support a carriage 408 which carries both a scraper 410 and a gripper 412. The carriage is moved by a cylinder 414 mounted on support 401 and through which the piston rod 416 extends. The piston rod is connected directly to the carriage so that actuation of cylinder 414 causes the carriage 408 to move on its rails 404 and 406.

Scraper 410 is in the form of a horizontal blade which is designed to bear against the bottom surface of the upper griddle plate 80 so as to strip the fortune cookie blank B from it. The gripper 412 is in the form of a small plate pivotally mounted at its bottom on pins 418 connected to carriage 408 and actuated by the small cylinder 420. When the cylinder is energized, the gripper 412 pivots counterclockwise as viewed in FIG. 20 to ward the scraper 410 and the edge of cookie blank B peeled from the upper griddle plate 80. Spring 422 biases the gripper 412 to the retracted position shown in FIG. 20, away from the scraper.

The carriage 408 also carries a second scraper 424 which may scrape the cookie blank from the lower griddle plate 74 should the blank adhere to that griddle plate when the plates 74 and 80 are opened. The scraper 424 has a scraping edge 426 which is adapted to dip into the recess 76 in the lower griddle plate 74 to perform its function. It is to be understood that a similar scraper may be mounted on the carriage of the preferred embodiment to remove any blank that may adhere to the bottom griddle plate.

The support 401 which carries the actuating cylinder 414 as well as carriage 408 rails 404 and 406, scraper 410, gripper 412, cylinder 420, etc. is pivotally supported on pivot pins 430 on posts 432 so that the support and all of the structure mounted on it can pivot about the horizontal axis defined by the pins 430, as suggested in FIG. 20. The pivotal action of the support is controlled by a tilt cylinder 434 mounted on plate 402. When tilt cylinder 434 is actuated, the support and its associated parts tilt counterclockwise as viewed in FIG. 20, so that when the scraper 410 and gripper 412 move to the left between the upper and lower plates of griddle 78, the scraper is spaced from the lower surface of the upper griddle plate. Therefore, the scraper can assume the position beyond the edge $B^1$ of the griddle, as suggested in FIG. 22. Once the carriage has transported the scraper and gripper to the position of FIG. 22, cylinder 434 may be deenergized, and spring 435 acting in compression may rotate the support 401 in a clockwise direction so as to move the scraper into engagement with the lower surface of griddle plate 80. Thereafter, when the carriage is withdrawn by the piston 414, the scraper peels the cookie blank from the bottom of plate 80. Actuation of the cylinder 420 causes the gripper 412 also to engage the edge $B^1$ of the cookie blank, and continued travel of the carriage to the right strips the entire blank from the plate. The cookie blank B is ultimately deposited in the well 202 of upper turntable 200 in the same manner as described in connection with the mechanism of FIG. 4.

Operation

The machine of this invention is designed to make fortune cookies without manual assistance. The machine is fully automatic and an attendant is required only to assure that the various ingredients used on the machine are in supply on the machine. That is, an attendant is required to make sure that the supply of oil and dough batter for the griddles is not exhausted. Furthermore, the operator must ensure that the magazine has an adequate supply of fortune slips. Other than those simple tasks, which obviously do not command the full attention of an operator, the machine will function by itself to manufacture the fortune cookies on a continuous basis. It is estimated that the machine of this invention may produce 1700 cookies per hour.

As suggested, before the machine is placed in operation, the operator should determine that there is a plentiful supply of oil for coating the griddles and that there is a adequate supply of dough batter for the cookies. In addition, the operator must check to make sure that the magazine is filled with the fortune slips. With this done, the operator ignites the burners 110 and 112 and places stepper motors 42 and 48 which drive the respective turrets in operation. The step by step motion of the two turrets is synchronized so that as a griddle is placed in station A to provide a baked cookie blank to be transferred from the baking assembly to station E of the stuffing and forming assembly, an empty recess 202 in the upper turntable 200 of the latter assembly turns during each step is of course smaller than the arc of each step turn of the stuffing and forming assembly because there are three times as many griddles on the baking assembly as there are recesses in the upper turntable.

With the stepper motor in operation, and with the griddles in the various stations, the latching mechanism 63 will hold the turret firmly against continued rotation while the griddle in station B is cleaned by the wire brush mechanism or other such device provided. The operation of the machine begins the functions of stations C and D may be delayed one or two steps respectively, or alternatively the first few cookies made may be discarded to assure that the finished products are made in clean and properly oiled griddles. With the cleaning step completed in station B, the latching device 63 will unlock and permit the turret 38 to turn one step to move the griddle in station B to station C. Of course all of the griddles on the turret will move one step as well.

In station C the griddle is oiled and the next griddle is moved into station B for cleaning. The turret will then move another step and dough will be deposited in the griddle in station D while of course the functions performed in stations B and C will be repeated with each succeeding griddle that moves into the stations.

After each griddle leaves station D, the cam rollers 94 and 96 in cooperation with the cam tracks 98 and 100 will allow the griddles to close, and as they move about the circumference of the turret through oven hood 108 the cookie blanks will be fully baked. As the griddles leave the oven at the proximity of the ends of burners 110 and 112, the cam rollers 94 and 96 in cooperation with the tracks 98 and 100 open them so that when each griddle reaches station A, the griddles are fully opened. At station A the transfer mechanism 45 peels the cookie blank from the upper griddle and deposits it in the recess 202 of the upper turntable 200, which is in station E. It will be noted that during the transfer operation the cookie blank is inverted so that the face of the cookie blank in contact with the upper griddle plate 80 becomes the lower and subsequently outer surface of the fully formed fortune cookies. This is desired because the upper griddle ordinarily produces a smoother and more evenly colored surface than the lower griddle.

After the blank is deposited in the recess of the turntable at station E, it moves step by step to station F where the two vacuum devices remove a message slip from the magazine 226 and deposit it on the face of the cookie blank. The vacuum head 272 also serves to push the blank through the transverse slot 290 in the recess causing the blank to fold up about the sides of the head 272. Thereafter the forming subassembly 300 slides the folded cookieblank off head 272 and causes it to fold again about the folding pin 292 on the lower turntable. Thereafter the forming subassembly crimps or puckers the twice folded blank to complete the forming operation. To complete the operation, the fully formed fortune cookie on the pin 292 moves step by step away from station F through the next 90° of travel of the turret, and the cookie is stripped from the pin by the stripping cam 350.

Third Embodiment of Cookie Transfer Mechanism and Forming and Stuffing Assembly

In FIGS. 23 to 38 another alternative form of cookie transfer mechanism and stuffing and forming assembly are shown. The cookie transfer mechanism is generally designated by reference 500, while the stuffing and forming assembly is designated by reference 502. Unlike the stuffing and forming assembly 32 in the embodiment of FIG. 1, the stuffing and forming assembly of this embodiment is mounted on a stationary table and the blanks are delivered one at a time to the assembly where they are stuffed and formed and then removed as complete fortune cookies.

The transfer mechanism 500 is shown in detail in FIGS. 23 to 29. The transfer mechanism 500 is carried on the table 504 which may be supported by any convenient means immediately adjacent the baking assembly 30. The baking assembly is identical to that shown in FIG. 1 and, therefore, the parts bear the same reference characters and it is not again described. The transfer mechanism includes a generally horizontal arm 506 shown in its at rest position in full lines in FIG. 23, and its extreme position in broken lines in that figure. Arm 506 is carried on the upper end of shaft 508 (see FIG. 27) supported on bushings 510 within sleeve 512. The shaft 508 is raised and lowered by phenumatic cylinder 514 and is turned through approximately 90° from the position shown in full line to the position shown in broken lines in FIG. 23 by the air cylinder 516.

The arm 506 itself includes an inner shaft 518 and a sleeve 520. In FIGS. 24 and 25, sleeve 520 is shown to carry a finger 522, while shaft 518 carries a second finger 524. An electrical solenoid 526 connected to shaft 518 by coupling 528 (see FIG. 28) rotates the shaft 518 with respect to the sleeve 520 so as to move the finger 524 toward and away from the finger 522 so that they may cooperate to grasp the cookie blank edge scrapped from the upper griddle plate 80. Sleeve 520 also carries a scrapper 530 to peel an edge of the cookie blank B from the lower surface of the upper griddle plate 80 so that it may be engaged by the fingers.

As indicated above, the cylinder 514 serves to raise and lower the arm 506 while the cylinder 516 swings the arm between the positions shown in FIG. 23. A lever 532 carried on the sleeve 520 of the arm serves to rotate the entire arm assembly so as to cause it to flip over from the position shown in FIG. 24 to that of FIG. 25 to turn the cookie blank B upside down when it is placed in the stuffing and forming assembly.

The transfer mechanism shown in FIG. 23 to 29 operates as follows: When the baked cookie blank is brought to station A by the rotating turret of the cooking assembly, the upper grill plate 80 lies above the end of arm 506 carrying the fingers 522 and 524 along with scrapper 530. With the arm 506 in the rest position, the cylinder 510 raises shaft 508 so as to place the scrapper 530 against the lower surface of the griddle plate 80 adjacent the edge of blank B. Next, cylinder 516 is actuated so as to cause the arm to pivot through a few degrees so that the scrapper moves approximately one inch across the lower surface of the plate 80 to free the edge of the cookie blank B. The edge drops into position between the fingers 522 and 524 as shown in FIG. 24. Thereafter, solenoid 526 rotates the shaft 518 so as to close the fingers about the edge of the cookie blank B so that the blank is gripped firmly and may be peeled from the lower surface of griddle plate 80.

With the edge of the cookie blank firmly gripped between the fingers 522 and 524, the cylinder 514 returns the shaft 508 to its lower position and as the cylinder 516 continues to rotate the shaft 508, the lever 532 carried on the end of arm 506 engages the cam 534 so as to cause the arm to flip over from the position shown in FIG. 24 to that shown in FIG. 25. And, continued motion of the arm about the axis of shaft 508 under the influence of cylinder 516 causes the fingers to peel the blank B from the lower surface of griddle plate 80 and move it in position above the stuffing and forming assembly 502. When the arm 506 reaches the extreme position shown in FIG. 23 in broken lines, the fingers 522 and 524 release the cookie blank and it drops into the dish of the forming and stuffing assembly.

In FIGS. 30 to 32, the fortune message slip magazine and transfer device 550 is shown in detail. In FIG. 23, the subassembly 550 is shown supported on table 504 as part of the forming and stuffing assembly.

The subassembly 550 includes a magazine 552 supported on a bracket 554 so that the magazine is generally inclined to the vertical. The fortune message slips P are stacked in the magazine and lie in planes generally perpendicular to the axis or center line of the magazine. The stack of slips P are supported in the magazine by finger 556 in turn supported on piston rod 558 of cylinder 560 carried on the side of the magazine. The finger 556 extends below the bottommost fortune slip P in the magazine through the slot 562 in the magazine wall 564, and the finger controlled by the cylinder serves to raise and lower the stack of slips as suggested in FIGS. 31 and 32.

A vacuum head 570 having an inclined face 572 parallel to the plane of the slips P in the magazine is carried on a support 574 mounted on the piston rod 576 of cylinder 578, and a vacuum line 580 is suggested registering with thin slit 582 in the face 572 of the head.

In FIG. 31, the vacuum head 570 is shown positioned immediately beneath the lower end of magazine 552, and the finger 556 supports the fortune slips P in a position so that the lowermost slip in the magazine is in face-to-face contact with the head 570. When a fortune slip is to be transferred from the magazine 552 to the position of the dish of the stuffing and forming assembly, a vacuum is created in the slot 582 of head 570, and simultaneously the cylinder 560 is activated to lift the stack of slips P in the cylinder as suggested in FIG. 32. The lowermost slip P' in the magazine under the influence of the vacuum in slit 582 is retained against the head 570 while the other slips above it are lifted by the finger 556. A push pin 584 controlled by cylinder 586 also mounted on magazine 552 serves to push against the edge of the slip P' immediately adjacent the finger 556 so as to free the edge from the finger as the finger rises to raise the other slips in the magazine. Thus, the lowermost slip P' is completely freed from the other slips in the magazine and is free to be transported by the head to the dish of the stuffing and forming assembly. The cylinder 578 which carries the head 570, upon actuation extends the rod 576 so as to place the slip in position above the dish as is suggested in FIG. 33 and described in detail below. The vacuum at the slit 582 is turned off when the slip P' is positioned above the dish of the stuffing and forming assembly, and in fact pressure in the line 580 may be reversed so as to push the slip or blow it onto the fortune cookie blank.

In FIGS. 33 to 38, the stuffing and forming assembly is shown in detail. In FIG. 33 the assembly is shown to include a cup-shaped dish 600 carried on a platform 602 disposed above the table 504. The dish 600 has a transverse slot 604 across its bottom, and a gap 606 in the platform 602 is aligned with the slot so that the cookie blank B can be folded by being forced through the slot 604 as described below.

Below the platform 602 is a stationary folding bar 608 which is perpendicular to the long dimension of slot 604. The folding bar is carried on a frame 610 that also carries cylinder 612 and comprises part of the folding assembly. Platform 602 also carries a cylinder 614 having a piston 616 which in turn carries an arm 618 which moves up and down in response to actuation of the cylinder. The free end 620 of arm 618 carries a downwardly extending blade 622 aligned with the center of the slot 604. The blade 622 in turn carries a bridge 624 having holes 626 through which floating pins 628 extend and which, as described below, serve to align the cookie blank in the cavity of the dish 600 before it is engaged by the blade and folded about it by the downward motion of the blade as it passes through the slot 604. The blade is shown in FIGS. 34 and 35 to have thin vertical edges 630 that cooperate with the forming assembly beneath the dish.

The folding assembly 640 controlled by cylinder 612 includes two pairs of fingers which act much like the fingers in the forming assembly 300 shown in FIGS. 15 to 17. One pair of fingers lies on each side of the plane of the folding blade 622. The pairs are separately identified by references 642 and 644. The individual fingers are pivotally supported on block 646 carried on the top of piston 648 of cylinder 612.

The pair of fingers 644 are movable toward their opposite fingers 642 by means of the cam plate 650 and cam follower 652. It will be noted in FIGS. 33, 34 and 37 that the follower 652 engages the surface of cam 650, and as the follower rides upwardly on the step 654, the fingers 644 move to the right toward the opposite fingers 642 and when the follower drop off the step either above or below it, the pairs of fingers move apart under the influence of compression spring 656 disposed between the opposite fingers. The follower 652 is, of course, forced to follow the cam surface under the influence of the cylinder 612 as it is actuated to move the pairs of fingers downwardly from the position of FIGS. 33 and 34 to the position of FIG. 37.

The stuffing and forming assembly of FIGS. 33 to 38 operates as follows: The arm 520 of the transfer mechanism swings to the position shown in broken lines in FIG. 23 and the surface of the cookie blank B in contact with the upper griddle plate 80 faces downwardly as the arm deposits the blank in the dish 600. The fingers 522 and 524 release the blank and it may typically assume the position shown in broken lines in FIG. 33. Immediately after the blank B is deposited in the dish 600, the vacuum head 570 of the fortune message transfer device deposits the slip of paper P on top of the blank in the dish. Next, cylinder 614 is activated and the folding blade 622 starts downwardly from the position shown in FIG. 33 to the position shown in FIG. 34. The centering pins 628 engage the cookie blank and serve to generally align the cookie blank in the dish so that it assumes the full line position of FIG. 33. As the blade continues in the downward direction, it folds the blank about its side faces by virtue of pushing the blank through the slot 604 as is suggested in FIG. 34. With the cookie blank in the position shown in FIG. 34, the cylinder 612 is actuated so as to draw its head 646 in a downward direction. As the respective pairs of fingers begin their downward travel, the follower 652 in contact with the cam 650 rides up the step 654 so as to press the pads 660 against the folded cookie blank on the blade 622 so that the pads actually carry the cookie blank downwardly off the blade as the cylinder 612 continues to retract in a downward direction. It will be noted in FIG. 35 that the pads 660 are aligned with the thin edges of the blade so as to pinch the ends of the blank fairly close together.

The plate 610 which carries cylinder 612 has a pair of cam slots 662 symmetrically formed behind the two blades of pair 642 and on either side of the fixed folding bar 608. The cam slots 662 are generally S shaped but converge toward one another in a downward direction. Followers 666 carried by the blades 642 ride in the slots, and as the fingers move downwardly in response to the retraction of cylinder 612, the pads 660 pull the cookie blank downwardly off the folding blade 622 and in turn fold the once folded blank about the fixed folding bar 608. This is evident from an inspection of FIGS. 35 and 36. It will be noted in FIG. 36 that as the block 646 moves downwardly, the cam slots 662 force the fingers 642 close together. It will be appreciated that the opposite fingers 644 are similarly moved together under the action of the cam slot and followers 656 by virtue of the connection between opposed fingers by the pins 670. As the once folded cookie blank is completely folded about the bar 664, the cam follower 652 carried on fingers 644 drop off the lower end of step 654 and the fingers open to release the cookie blank. Actually in FIG. 36 the pads 660 are shown disposed below the cookie blank B having released the blank as the opposed fingers spread apart. This same condition is shown in FIG. 37. The fortune cookie is completely formed and hangs on the fixed folding bar 608 and is ready to be pushed off the bar and be suitably packaged by the bakery. It will be noted in FIGS. 35 and 36 that springs 672 carried by the fingers 642 have a gently curved section at the top which bears against the cookie blank or the blank sits on the folding bar 608 so as to retain the cookie in shape while it is still soft (before it is adequately cooled so as to retain its shape).

With the cookie fully formed and resting on the fixed folding bar 608, a pusher subassembly 676 slides the blank to the left as viewed in FIG. 37 off the bar 608 as suggested by the broken line shown in that figure. The pusher subassembly includes a cylinder 678 carried by bracket 680 suspended from platform 602. The cylinder 678 carried a pusher pad 682 which can move from the retracted position of FIG. 37 to the extended position wherein the fortune cookie is engaged along the top edge by spring 684 and along the sides by inclined keepers 686. The spring 684 and the keepers 686 serve to hold the cookie in place on the bar but at the same time allow the cookie to slide on the bar so that each may be withdrawn. The cookies may either be manually removed from the bar, or the bar may be provided with a slope so as to allow them to slide from it to a point of collection such as a shipping carton.

Preferred Embodiment of Cookie Transfer Mechanism and Forming and Stuffing Assembly In FIGS. 39 to 42, the preferred form of cookie transfer mechanism and stuffing and forming assembly are illustrated. These parts most closely resemble the embodiment shown in FIGS. 23 to 38. Where the mechanisms are identical, little or no description is deemed necessary, and like parts bear like numbers.

The preferred cookie blank transfer mechanism 700 like the mechanism 500 in the embodiment of FIGS. 23 to 29 includes a pair of gripping fingers 702 and 704 as well as scraper 706. The scraper peels the edge of the cookie blank from the top plate of the griddle and the fingers grasp that edge and carry the cookie blank to the forming assembly as was fully described in connection with the earlier described embodiment. The fingers and scraper are supported on the ends of arm 708 carried on a vertical post 710 on which the arm swings between the position shown in FIG. 39 wherein it removes the cookie blank from the griddle and the position shown in FIGS. 41 and 42 wherein the blank is deposited on the forming assembly. Rotation of the arm 708 so as to invert the cookie blank is achieved by means of the solenoid 712 in the manner described in connection with the earlier embodiment. It will be noted that the fingers and scraper as shown in FIG. 42 are rotated approximately 180° from the position shown in FIG. 39.

The forming assembly 720 which bears many similarities to the embodiment of FIGS. 33 to 38 includes a slotted cup-shape dish 722 in which the cookie blanks are deposited by the transfer mechanism 700. As shown in FIGS. 40 to 42, wall segments 724 and 726 lie adjacent the edge of the dish 722 on the table 728 that supports the stuffing and forming assembly. The segments 724 and 726 serve as guides to assist in centering the cookie blank in the dish 722 when it is deposited by the transfer mechanism. In order to further assure that the cookie blank is properly positioned in the dish, an aligning device 730 is provided, which consists of a generally horizontal arm 732 pivotally supported on vertical post 734 mounted on table 728 adjacent the dish 722. Arm 732 which carries a finger 736 that is aligned with the slot 738 in the dish 722. As viewed in FIGS. 39 and 42, the arm 732 is biased to a counterclockwise position about its support 734 by spring 740 connected to one end of the arm. The spring urges the arm 732 against stop 742 as shown in FIG. 39. The other end of arm 732 carries an upstanding pin 744 in the path of arm 708 of the transfer mechanism. As the arm 708 moves from the position shown in FIG. 39 to that shown in FIG. 42 so as to deposit the cookie blank in the dish 722, arm 708 engages the pin 744 and causes arm 732 to pivot against the bias of spring 740 about its pivotal support 734, which causes the finger 736 to center the cookie blank on the dish 722 within the segments 724 and 726 particularly if the blank falls short of the dish. When the arm 708 returns to the position shown in FIG. 39, the pin on arm 732 is released and the arms returns to the position shown in FIG. 39 under the influence of its spring 740.

In accordance with this preferred embodiment, the paper fortune messages P are stored in a magazine 750 in turn mounted on carriage 752 designed to move the magazine between the positions shown in FIGS. 40 and 41 in contact with and spaced from the vacuum head 754 of the fortune transfer mechanism. In FIG. 39 the magazine 750 is shown to have a slotted top wall 756, and a slide block 758 extends through the slot to the interior of the magazine and bears against the end of the horizontal column of fortune messages P. A leaf spring 760 carried by post 762 engages the slide block 758 to urge it in the direction of arrow A so as to force the fortune messages P against small lips (not shown) at the front end 762 of the magazine.

Magazine carriage 752 is slidably supported on bracket 764 on the top of post 766 by means of rail 768 that extends through openings in the spaced arms of bracket 764. The carriage is moved on bracket 764 by means of crank 770 pivoted at 772 on the bracket. One arm of the crank is connected to the block 776 on the bottom of the carriage. It will be appreciated that when the actuating rod 774 is moved downwardly as suggested by arrow B from the position of FIG. 41 to that shown in FIG. 40, crank 770 pivots clockwise so as to move the carriage 752 to the right and causes the forwardmost message slip P in the magazine front end 762 to engage the free end of the vacuum head 754. And when the actuating rod 774 is moved in the opposite direction back to the position shown in FIG. 41, and suggested by arrow C, the crank 770 pivots counterclockwise, moving carriage 752 to the left, and separating the front end 762 of the carriage from the vacuum head 754.

The vacuum head 754, in accordance with this embodiment, serves not only to transport the fortune message P from the magazine and deposit it in the center of the cookie blank on the dish 722, but in addition, it performs the function of blade 622 in the embodiment of FIGS. 33 to 38 as will become apparent presently.

As shown in FIGS. 39 to 42, the vacuum head 754 is generally L-shaped and is carried on a plate 778 in turn supported by sliding pivots 780 in vertically extending slideways 782 formed in the vertical panels 784 and 786 on table 728. Plate 778 also carries a cam follower 790 disposed in cam track 792 formed in panel 784. The plate 778 is actuated by a rod 794 pivotally secured to it so as to move the vacuum head 754 between the extreme positions shown in FIG. 40 and the full line showing of FIG. 41.

The working end 798 of the vacuum head 754 has a vacuum port 800 extending from its face 802 to a vacuum line 804 in turn connected to a vacuum pump (not shown). When the vacuum head 754 is in the position shown in FIG. 40, and the fortune magazine 750 is in the position also shown in that figure, and vacuum is applied to the port 800, the face 802 of the head will engage and retain the forwardmost fortune paper P in magazine 750, and the paper P will remain on the head when the magazine is drawn away from it as suggested in broken lines in FIG. 41. When the actuating rod 794 is pulled downwardly in the direction of arrow E in FIGS. 40 and 41, the head 74 carrying the fortune slip P will move from the upper position as shown in FIG. 41 through the intermediate position identified at 754' to the full line position in that figure. The movement of the vacuum head 754 in that fashion is accomplished by means of sliding pivots 780 in the slideways 782 and the cam and cam track 790 and 792 respectively. As the actuating rod 794 moves downwardly, the vacuum head pivots about the sliding pivot 780 because the cam 790 in the upper portion of the cam track 792 initially prevents the plate 778 from moving translationally, that is, remaining in a horizontal plane, as it is pulled downwardly from the uppermost position. Thus, the vacuum head pivots in the manner illustrated in FIG. 41 until the working end 798 of the head is disposed vertically in alignment with the slot 738 in the dish 722. The working end 798 of the vacuum head preferably is shaped like the blade 622, and it will be appreciated from a comparison of FIGS. 41 and 34 that the working end 798 cooperates with blades 642 and 644, pads 652, folding bar 608, etc. in the same manner as described above so as to fold the cookie blank into the final form about the bar. Unlike the earlier embodiment, however, the same element, namely, the vacuum head 754 serves the dual function of depositing the fortune message slip P on the cookie blank and shaping the blank in cooperation with the other folding elements.

Scraping and Oiling Assembly

In FIGS. 39, 43 and 44 apparatus is shown for cleaning and oiling the griddles in stations B and C identified in FIG. 2. It is to be understood that this apparatus can be used in any of the embodiments shown, and in fact, in FIG. 39 it is shown in a machine incorporating the preferred embodiment of transfer mechanism, fortune slip stuffing and cookie forming assembly. The apparatus shown in FIGS. 39, 43 and 44 is supported on a platform 900 pivotally mounted on arms 902 pivoted at the bottom on frame section 904. The platform 900 carries a drive motor 906 whose shaft 908 extends through the platform and carries drive pulley 910. A pair of additional pulleys 912 and 914 are supported on shafts 916 and 918 respectively, below the platform 900 in side-by-side relationship and respectively positioned on the platform to be moved into stations B and C of the baking assembly 30. The pulleys 912 and 914 and their respective shafts are driven by the belt 920 which extends about them and the drive pulley 910.

A lower plate 922 parallel to the platform 900 is disposed below the driven pulleys 912 and 914 so as to rigidify the assembly. Shafts 916 and 918 carry a pair of wheels 924 and 926 beneath the lower plate 922, and the wheels are driven by the shaft in response to rotation of the driven pulleys 912 and 914.

Wheel 924 carries on its lower surface an array of cleaning stones 930 which clean the lower griddle plate 74 of each griddle as it pauses in station B of the baking assembly 30, while wheel 926 carries an oil applicator 932 that deposits a film of oil on each lower griddle 74 as it pauses in station C. Oil is transferred to the applicator 932 by means of an oil line 934 that extends from upper plate 900 to the lower plate 922, which in turn has channels (not shown) formed in its surface which carry the oil to shaft 918 where additional passages (not shown) are provided to transfer the oil to the applicator 932. As suggested in FIG. 43, a scraper 936 is mounted on the platform 900 and is positioned to engage the lower surface of each upper griddle plate 80 as it approaches station B.

As noted in FIGS. 43 and 44, an actuating rod 940 is connected to the platform 900, and upon actuation of the rod in the direction suggested by arrow G, the platform 900 and all of the parts of the cleaning and oiling assembly carried by the plate moves into position so as to cause the cleaning stones and applicator on the wheels 924 and 926 to respectfully engage the lower griddle plate 74 in the stations B and C to perform their respective functions.

From the foregoing description, those skilled in the art will appreciate that numerous modifications may be made of this invention without departing from its spirit. Therefore, I do not intend to limit the scope of this invention to the embodiments illustrated and described. Rather, it is intended that the scope of this invention be determined by the appended claims and their equivalents.

What is claimed is:

1. A machine for baking and forming fortune cookies comprising:

a rotatable turret carrying a plurality of griddles for baking a flat cookie blank, means for rotating the turret to move each of the griddles through a plurality of stations, one of said stations being suitable for depositing batter in each griddle as each passes through said station, a second station having stripping means for removing the cookie blanks from the griddle, and baking means in the form of an oven for baking cookie blanks as the griddles move from the first to the second station, a second turret having a plate with a plurality of cookie blank supports, means for rotating said second turret to sequentially align the cookie blank supports with the stripping means so that each support may receive a cookie blank stripped from a griddle in the second station of the first recited turret, a fortune paper slip depositing mechanism mounted adjacent the second turret for depositing a slip on each flat cookie on the cookie supports of the second turret, fortune cookie forming means mounted adjacent the second turret for folding each cookie about the slip, and means for removing the formed cookie from the second turret.

2. A machine for baking and forming fortune cookies as defined in claim 1 further characterized by said motor being a stepper motor causing each griddle to stop for a prescribed period in each station.

3. A machine for baking and forming fortune cookies as defined in claim 1 further characterized by said griddles each comprising a top and bottom plate, and means for automatically closing the plates after each griddle leaves the first station and opening the plates as they approach the second station.

4. A machine for baking and forming fortune cookies as defined in claim 2 further characterized by latching means for locking the turret against rotation as each griddle is positioned in each station.

5. A machine for baking and forming fortune cookies as defined in claim 3 further characterized by the bottom plate of each griddle being rigidly fixed to the turret, and said top plate of each griddle being carried on a hanger with cam means on each hanger cooperating with cam means mounted above the turret for opening and closing the plates in the prescribed positions of the turret.

6. A machine for baking and forming fortune cookies as defined in claim 1 further characterized by a table for the second turret, said stripping means being mounted on said table and extending into the second station of the first recited turret when stripping the cookies from the griddles and carrying them back to the cookie supports on the second turret.

7. A machine for baking and forming fortune cookies as defined in claim 6 further characterized by said stripping means further including track means mounted on the table and permanently positioned to extend to the second station, a carriage movably mounted on the track means, a cylinder and piston rod mounted on the table and moving the carriage, and a scraper mounted on the carriage and positioned to scrape the baked cookie off the griddle in the second station.

8. A machine for baking and forming fortune cookies as defined in claim 3 further characterized by said scraping means being positioned to scrape the cookie blanks from the top plate when the griddle is opened.

9. A machine for baking and forming fortune cookies as defined in claim 8 further characterized by a gripper finger also mounted on the carriage, and a piston connected to the finger for actuating it toward and away from the scraper so that the scraper and finger cooperate to hold the edge of the cookie and peel it off the upper plate.

10. A machine for baking and forming fortune cookies comprising:

a rotatable turret carrying a plurality of griddles for baking a flat cookie blank, means for rotating the turret to move each of the griddles through a plurality of stations, one of said stations being suitable for depositing batter in each griddle as each passes through said station, a second station having stripping means for removing the cookie blanks from the griddle, and baking means in the form of an oven for baking cookie blanks as the griddles move from the first to the second station, a forming and stuffing assembly disposed adjacent the turret and aligned with the stripping means, at least one dish in the forming and stuffing assembly for receiving cookie blanks on at a time stripped from the griddles in the second station;

a fortune paper slip depositing mechanism mounted adjacent on the forming and stuffing assembly for depositing a slip on each cookie in the dish, means including a folding blade on the forming and stuffing assembly for folding each blank after the slip is deposited on it, and means forming part of the assembly for stripping the once folded blanks from the blade and folding them a second time across the first fold.

11. A machine for baking and forming fortune cookies as defined in claim 10 further characterized by said assembly also including a movable support for the blade, said blade being substantially flat, and a slot in the dish aligned with the blade through which the blade may move causing a cookie blank on the dish to fold up on the sides of the blade and pass through the slot with the blade.

12. A machine for baking and forming fortune cookies as defined in claim 11 further characterized by said means for stripping the once folded blanks also including two pairs of fingers, one pair on each side of the plane of the blade with the pairs facing one another, a folding bar disposed between the fingers of each pair and generally perpendicular to the plane of the blade, and actuating means connected to the fingers for causing the pairs of fingers to close against the blade and the cookie blank folded on it and draw the blank off the blade and over the bar causing the bar to create the second fold in the blank perpendicular to the first fold.

13. A machine for baking and forming fortune cookies as defined in claim 12 further characterized by said actuating means also causing the fingers of each pair to move closer together as they draw the blank over the bar to create the fortune cookie shape from the blank.

14. A machine for baking and forming fortune cookies as defined in claim 10 further characterized by a fortune message slip magazine forming part of the assembly, and a transfer device operatively associated with the magazine for extracting said slips one at a time from the magazine and depositing them on the blanks on the dish before the blanks are folded.

15. A machine for baking and forming fortune cookies comprising:

a plurality of griddles for baking cookie blanks, a forming and stuffing assembly disposed adjacent the griddles, at least one dish in the assembly for receiving blanks from the griddle, a transfer mechanism for moving the baked blanks from the griddle to the dish support, means including a blade disposed above the dish for folding the blanks about the blade, and means forming part of the assembly for stripping the once folded blanks from the blade and folding them a second time across the first fold;

said transfer mechanism for moving the blank from the griddle to the plate including, an arm mounted adjacent the assembly and having gripping means at one end, a scraper also mounted on said one end of the arm and operatively associated with the gripping means, actuating means connected to the arm for causing the arm to draw the scraper across the griddle to peel an edge of the blank off the griddle, second activating means connected to the arm for causing the gripping means to engage and disengage the edge of the blank peeled from the griddle, and third actuating means connected to the arm for causing it to move the gripping means so as to carry the cookie blank from the griddle to the plate.

16. A machine for baking and forming fortune cookies as defined in claim 15 further characterized by a platform for the assembly and transfer mechanism, a vertical support for the arm holding the arm at its other end for swinging motion in a generally horizontal plane, and means carried by the support causing the arm to rotate to turn over the blank carried by the gripping means.

17. A machine for baking and forming fortune cookies comprising:

a plurality of griddles for baking cookie blanks, a forming and stuffing assembly disposed adjacent the griddles, at least one dish in the assembly for receiving blanks from the griddle, a transfer mechanism for moving the baked blanks from the griddle to the dish support, means including a blade disposed above the dish for folding the blanks about the blade, and means forming part of the assembly for stripping the once folded blanks from the blade and folding them a second time across the first fold;

a fortune message slip magazine forming part of the assembly, and a transfer device operatively associated with the magazine for extracting said slips one at a time from the magazine and depositing them on the blanks on the dish before they are folded, said transfer device including the blade, said blade carrying the slip to the blank.

18. A machine for baking and forming fortune cookies as defined in claim 17 further characterized by said blade movable from a first position wherein it engages the message slip in the magazine to a second position wherein the blade is immediately above the dish to deposit the slip on the blank and to a third position wherein the blade passes through the dish causing the blank to fold up on the sides of the blade.

19. A machine for baking cookies and the like comprising a base and a rotatable turret mounted on the base and carrying a plurality of griddles, means on the base for rotating the turret to move each of the griddles step by step through a plurality of stations, an oven on the base through which the griddles moving when the turret rotates, each of said griddles including an upper and a lower plate, a track disposed adjacent the course travelled by the griddles, means connected to one of the plates of each griddle and to the track for opening and closing the plates of each griddle when the griddles are outside the oven;

a first station through which the griddles move where batter may be deposited on the lower plate of each griddle, a second station through which the griddles move after they leave the oven, cookie blank transfer means mounted adjacent the turret for removing the baked cookie blanks from the griddle when the plates are open, and third and fourth stations through which the griddles move after leaving the second station, cleaning and oiling means mounted adjacent the turret for heating the plate in the third and fourth stations;

said cleaning and oiling means including a pair of rotatable wheels movable in and out of the third and fourth stations and engaging the lower plates of the griddle in those stations, one of said wheels including a scrapping stone and the other an oil applicator.

20. A machine for making fortune cookies comprising a first assembly including griddle plates for baking fortune cookie blanks, a second assembly including a support and a dish which receives the blanks for stuffing fortune slips into the blanks and folding the blanks to form the fully shaped fortune cookies, and a transfer mechanism for moving the blanks from the griddles to the dish, said mechanism including:

an arm mounted on one of the assemblies and having gripping means at one end, a scraper operatively associated with the gripping means and mounted on the one end of the arm for scrapping an edge of a cookie blank from a griddle plate, first actuating means operatively connected to the gripping means for causing the gripping means to grasp the edge of the cookie blank scrapped from the griddle plate, and additional actuating means connected to the arm to swing said one end from the griddle plate to the dish.

21. A machine as defined in claim 20 further characterized by:
third actuating means connected to the arm for moving the scrapper into and out of engagement with the griddle plates.

22. A machine as define in claim 20 further characterized by:
said arm including inner and outer coaxial shafts,
said gripping means including a gripper plate carried by each shaft,
and said first actuating means including means connected to at least one of the shafts for causing relative rotation of the shafts with respect to one another.

23. A machine as defined in claim 22 further characterized by:
third actuating means connected to the arm for moving the scrapper into and out of engagement with the griddle plates.

24. A machine as defined in claim 20 further characterized by:
means connected to the arms for causing the arms to rotate together to invert the cookie blank.

25. A machine for making fortune cookies comprising a first assembly including griddle plates for baking fortune cookie blanks, a second assembly including a support and a dish which receives the blanks for stuffing fortune slips into the blanks and folding the blanks to form the fully shaped fortune cookies, and a transfer mechanism for moving the blanks from the griddles to the dish, said second assembly further including:

a fortune slip magazine carried on the support;

a movable blade carried on the support for transporting the slips from the magazine to cookie blanks deposited on the dish, means on the blade for carrying the slip, a slot in the dish sized to accommodate the blade, means connected to the blade causing it to move through the slot and fold the cookie blank upon the blade after the slip is deposited in it, and means disposed below the dish for removing the once folded blank from the blade and folding the cookie a second time across the first fold.

26. A machine as defined in claim 25 further characterized by:
said means for carrying the blade including a vacuum system.

27. A machine as defined in claim 26 further characterized by:
said means connected to the blade causing it to move through the slot causing the blade to move through an arcuate path to transport the slip from the magazine to the blank on the dish and thereafter to move translationally through the slot and fold the blank.

28. A machine as defined in claim 27 further characterized by:
said means disposed below the dish including:
two pairs of fingers, one pair on each side of the plane of the blade with the pairs facing one another,
a folding bar disposed between the fingers of each pair and generally perpendicular to the plane of the blade,
and actuating means connected to the fingers for causing the pairs of fingers to close against the blade and the cookie blank folded on it and draw the blank off the blade and over the bar causing the bar to create the second fold in the blank perpendicular to the first fold.

29. A machine as defined in claim 28 further characterized by:
said actuating means also causing the fingers of each pair to move closer together as they draw the blank over the bar to create the fortune cookie shape from the blank.

* * * * *